US012800328B2

(12) United States Patent
Furuta

(10) Patent No.: US 12,800,328 B2
(45) Date of Patent: Nov. 17, 2026

(54) VEHICLE CONTROL SYSTEM FOR SELECTING A TRAVELING ROUTE BASED ON AN AMOUNT OF MAP DATA INCLUDING A VERTICAL MOTION PARAMETER

(71) Applicant: TOYOTA JIDOSHA KABUSHIKI KAISHA, Toyota (JP)

(72) Inventor: Hiroki Furuta, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 19/258,366

(22) Filed: Jul. 2, 2025

(65) Prior Publication Data

US 2026/0049828 A1 Feb. 19, 2026

(30) Foreign Application Priority Data

Aug. 19, 2024 (JP) ................................ 2024-137619

(51) Int. Cl.
*G01C 21/34* (2006.01)
*G01C 21/00* (2006.01)
*G01C 21/36* (2006.01)

(52) U.S. Cl.
CPC ..... *G01C 21/3484* (2013.01); *G01C 21/3461* (2013.01); *G01C 21/3658* (2013.01); *G01C 21/3863* (2020.08)

(58) Field of Classification Search
CPC ............ G01C 21/3484; G01C 21/3461; G01C 21/3658; G01C 21/3863; G01C 21/3453; G01C 21/34; B60G 17/0165; B60W 60/001; B60W 50/14
See application file for complete search history.

(56) References Cited

U.S. PATENT DOCUMENTS 10,254,122 B2 * 4/2019 Bills .................. G01C 21/3484
2005/0071078 A1 * 3/2005 Yamada ............. G01C 21/3484 701/410
2017/0232915 A1 * 8/2017 Dufford ............... G01C 21/343 701/48
2018/0154723 A1 6/2018 Anderson et al.
2020/0293043 A1 * 9/2020 Torschmied ....... G01C 21/3453
2021/0190519 A1 * 6/2021 Blumentritt ........... B60W 10/18
2023/0017774 A1 * 1/2023 Giovanardi ........... B60W 40/06
2023/0083410 A1 * 3/2023 Furuta ................ B60G 17/0165 701/41
2023/0311606 A1 * 10/2023 Kojchev ............ B60G 17/0165 280/5.518

* cited by examiner

*Primary Examiner* — Dino Kujundzic
(74) *Attorney, Agent, or Firm* — Hunton Andrews Kurth LLP

(57) ABSTRACT

A vehicle control system includes: a storage device configured to store map data in which a vertical motion parameter is associated with a position on a map, the vertical motion parameter being relevant to vertical motion of a wheel of a vehicle; and one or more processors configured to control an objective vehicle based on the vertical motion parameter to be acquired from the map data. The one or more processors are configured to more preferentially select, as a traveling route of the objective vehicle, a route for which the amount of the map data is large than a route for which the amount of the map data is small.

9 Claims, 14 Drawing Sheets

200

| POSITION (LAT, LON) | UNSPRUNG DISPLACEMENT (Zu) | NUMBER OF TIMES OF TRAVELING (N) |
|---|---|---|
| | | |
| | | |
| | | |

| ROUTE CANDIDATE | MAP EXISTENCE RATIO | REQUIRED TIME | DISTANCE TO DESTINATION | FEE |
|---|---|---|---|---|
| A-ROUTE | 75% | 1h 40m | 70km | ¥0 |
| B-ROUTE | 60% | 1h 20m | 55km | ¥1,000 |
| C-ROUTE | 90% | 2h 20m | 110km | ¥0 |
| D-ROUTE | 85% | 1h 50m | 80km | ¥0 |

VEHICLE CONTROL SYSTEM FOR SELECTING A TRAVELING ROUTE BASED ON AN AMOUNT OF MAP DATA INCLUDING A VERTICAL MOTION PARAMETER

CROSS-REFERENCE TO RELATED APPLICATION

This application claims priority to Japanese Patent Application No. 2024-137619 filed on Aug. 19, 2024. The disclosure of the above-identified application, including the specification, drawings, and claims, is incorporated by reference herein in its entirety.

BACKGROUND

1. Technical Field

The present disclosure relates to a vehicle control system and a navigation system.

2. Description of Related Art

U.S. Patent Application Publication No. 2018/0154723 (US 2018/0154723 A1) discloses a road surface displacement map showing the correspondence relation between a road surface displacement (road surface roughness) and a position. A vibration damping control is performed by using the road surface displacement map. Specifically, the road surface displacement at a predetermined position ahead of a vehicle is previously recognized from the road surface displacement map. The control amount of an active suspension is previously calculated depending on the previously recognized road surface displacement. Then, the vibration of the vehicle is effectively restrained by controlling the active suspension at the timing when a wheel passes through the predetermined position.

SUMMARY

Map data about a parameter relevant to the vertical motion of the vehicle will be discussed. The map data is used for a vehicle control, such as the vibration damping control disclosed in US 2018/0154723 A1, for example. Meanwhile, it is difficult to create the map data about all positions on a map. Accordingly, practically, positions about each of which there is the map data and for each of which the vehicle control using the map data can be performed and positions about each of which there is no map data and for each of which the vehicle control using the map data cannot be performed exist in a mixed manner. When the traveling route of an objective vehicle for the vehicle control includes many positions about each of which there is no map data, the vehicle control cannot be performed in many cases. This makes it impossible for the vehicle control to sufficiently improve the comfortableness of the vehicle.

The present disclosure provides a vehicle control system and a navigation system that make it possible to select the traveling route of the objective vehicle so as to enhance the effectiveness of the vehicle control using the map data about the parameter relevant to the vertical motion of the vehicle.

An aspect of the present disclosure relates to a vehicle control system. The vehicle control system includes: a storage device configured to store map data in which a vertical motion parameter is associated with a position on a map, the vertical motion parameter being relevant to vertical motion of a wheel of a vehicle; and one or more processors configured to control an objective vehicle based on the vertical motion parameter to be acquired from the map data. The one or more processors are configured to more preferentially select, as a traveling route of the objective vehicle, a route for which the amount of the map data is large than a route for which the amount of the map data is small.

Another aspect of the present disclosure relates to a navigation system. The navigation system includes: a storage device configured to store map data in which a vertical motion parameter is associated with a position on a map, the vertical motion parameter being relevant to vertical motion of a wheel of a vehicle; and one or more processors configured to present a traveling route of an objective vehicle to a destination, to a user. The one or more processors are configured to more preferentially select, as the traveling route of the objective vehicle, a route for which the amount of the map data is large than a route for which the amount of the map data is small.

With the present disclosure, the route for which the amount of the map data is large is more preferentially selected than the route for which the amount of the map data is small, as the traveling route of the objective vehicle. Thereby, it is possible to select a route for which the amount of the map data is larger and for which the effectiveness of the vehicle control using the map data is higher, as the traveling route of the objective vehicle. As a result, it is possible to improve the comfortableness of the objective vehicle.

The more preferentially selecting, as the traveling route of the objective vehicle, the route for which the amount of the map data is large than the route for which the amount of the map data is small may include more preferentially selecting, as the traveling route of the objective vehicle, a route for which the ratio of a section with the map data is high than a route for which the ratio of the section with the map data is low.

The more preferentially selecting, as the traveling route of the objective vehicle, the route for which the amount of the map data is large than the route for which the amount of the map data is small may include more preferentially selecting, as the traveling route of the objective vehicle, a route for which a section with the map data is long than a route for which the section with the map data is short.

In the map data, the number of times of traveling of a vehicle that gets involved in evaluation of the vertical motion parameter may be further associated with the position on the map, and the more preferentially selecting, as the traveling route of the objective vehicle, the route for which the amount of the map data is large than the route for which the amount of the map data is small may include more preferentially selecting, as the traveling route of the objective vehicle, a route for which the number of times of the traveling per unit distance is large than a route for which the number of times of the traveling per unit distance is small.

The one or more processors may be further configured to select the traveling route of the objective vehicle based on an index different from the map data, acquire a priority regarding use of the map data that is set by a user, and select the traveling route of the objective vehicle such that the degree of the selection of the traveling route based on the index is lowered as the priority is higher.

The one or more processors may be further configured to present recommended position information to a user based on a position with the map data, while the objective vehicle is traveling on the traveling route, the recommended position information indicating a position where the objective vehicle is recommended to travel.

The recommended position information may indicate at least one of a lane, a place in a lane, and a guide line.

The one or more processors may be further configured to present, to a user, information indicating that the vertical motion parameter relating to a traveling position of the objective vehicle has been acquired, while the objective vehicle is traveling on the traveling route and the vertical motion parameter is enabled to be acquired from the map data.

The one or more processors may be further configured to present, to a user, information relevant to the ratio of a section for which the vertical motion parameter has been acquired on the traveling route from the map data, after the objective vehicle completes traveling on the traveling route.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Figure 1:
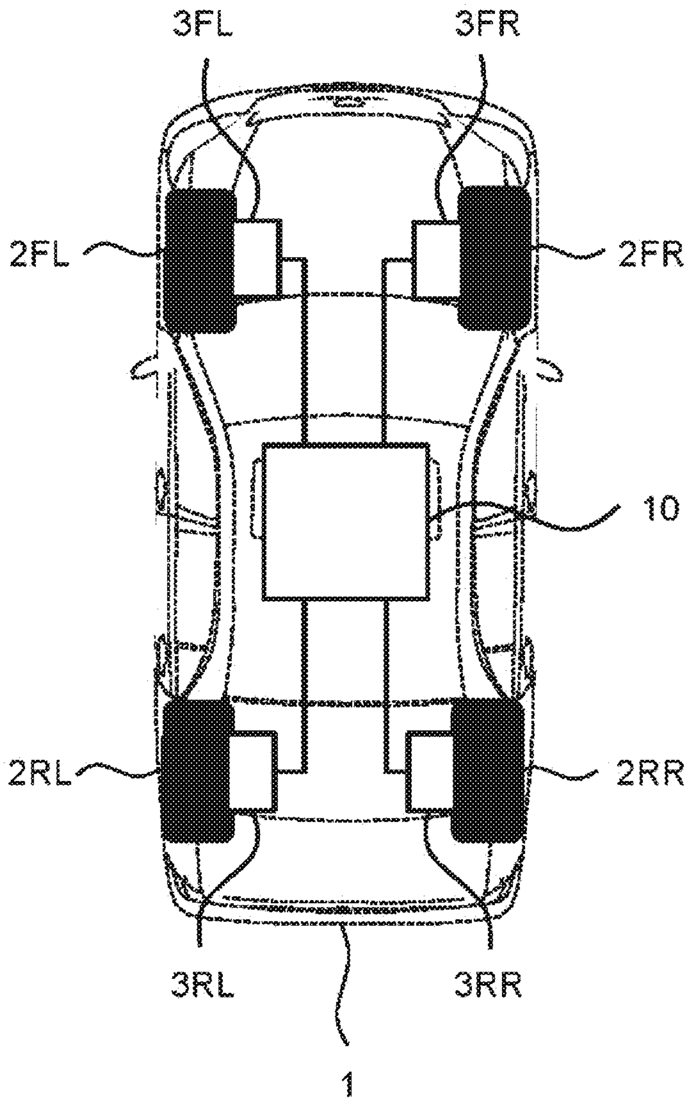
FIG. 1 is a schematic diagram showing an exemplary configuration of a vehicle according to an embodiment.

An embodiment of the present disclosure will be described below with reference to the accompanying drawing. In the figures, identical or corresponding constituents are denoted by identical reference characters, and descriptions thereof are simplified or omitted.

Suspension and Vertical Motion Parameter

FIG. 1 is a schematic diagram showing an exemplary configuration of a vehicle 1 (also referred to as an objective vehicle, hereinafter) according to the embodiment. The vehicle 1 includes a left front wheel 2FL, a right front wheel 2FR, a left rear wheel 2RL, and a right rear wheel 2RR. The vehicle 1 includes suspensions 3FL, 3FR, 3RL, 3RR that are provided for the left front wheel 2FL, the right front wheel 2FR, the left rear wheel 2RL, and the right rear wheel 2RR, respectively. In the following description, when it is not particularly necessary to make distinction, the wheels 2FL, 2FR, 2RL, 2RR are referred to as a wheel 2, and the suspensions 3FL, 3FR, 3RL, 3RR are referred to as a suspension 3.

Figure 2:
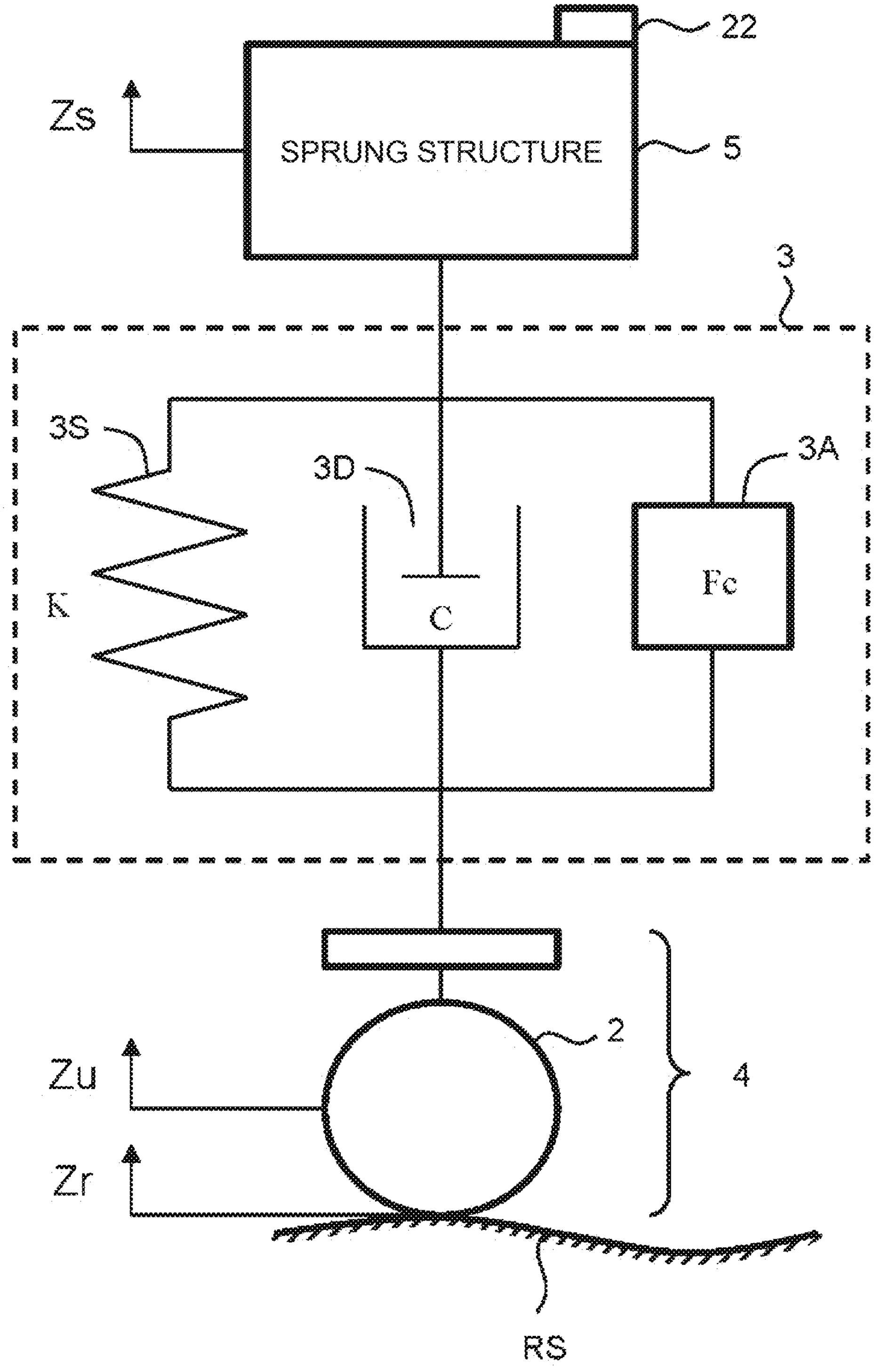
FIG. 2 is a conceptual diagram showing an exemplary configuration of a suspension according to the embodiment.

FIG. 2 is a conceptual diagram showing an exemplary configuration of the suspension 3. The suspension 3 is provided so as to couple an unsprung structure 4 and sprung structure 5 of the vehicle 1. The unsprung structure 4 includes the wheel 2. The suspension 3 includes a spring 3S, a damper (shock absorber) 3D, and an actuator 3A. The spring 3S, the damper 3D, and the actuator 3A are provided in parallel between the unsprung structure 4 and the sprung structure 5. The spring constant of the spring 3S is K. The attenuation coefficient of the damper 3D is C. The damping force of the damper 3D may be variable. The actuator 3A applies a control force Fc in the vertical direction between the unsprung structure 4 and the sprung structure 5.

Terms will be defined. A "road surface displacement Zr" is the displacement of a road surface RS in the vertical direction. An "unsprung displacement Zu" is the displacement of the unsprung structure 4 in the vertical direction. A "sprung displacement Zs" is the displacement of the sprung structure 5 in the vertical direction. An "unsprung velocity Zu'" is the velocity of the unsprung structure 4 in the vertical direction. A "sprung velocity Zs'" is the velocity of the sprung structure 5 in the vertical direction. An "unsprung acceleration Zu''" is the acceleration of the unsprung structure 4 in the vertical direction. A "sprung acceleration Zs''" is the acceleration of the sprung structure 5 in the vertical direction. The sign of each parameter is positive in the case of the upward direction, and is negative in the case of the downward direction.

The wheel 2 moves on the road surface RS. In the following description, a parameter relevant to the vertical motion of the wheel 2 is referred to as a "vertical motion parameter". Examples of the vertical motion parameter include the above road surface displacement Zr, unsprung displacement Zu, unsprung velocity Zu', unsprung acceleration Zu", sprung displacement Zs, sprung velocity Zs', and sprung acceleration Zs". It can be said that the vertical motion parameter is a "road surface displacement relevant parameter" relevant to the road surface displacement Zr.

As an example, a case where the vertical motion parameter is the unsprung displacement Zu will be described below. In the case of generalization, the "unsprung displacement" in the following description is replaced with the "vertical motion parameter".

Figure 3:
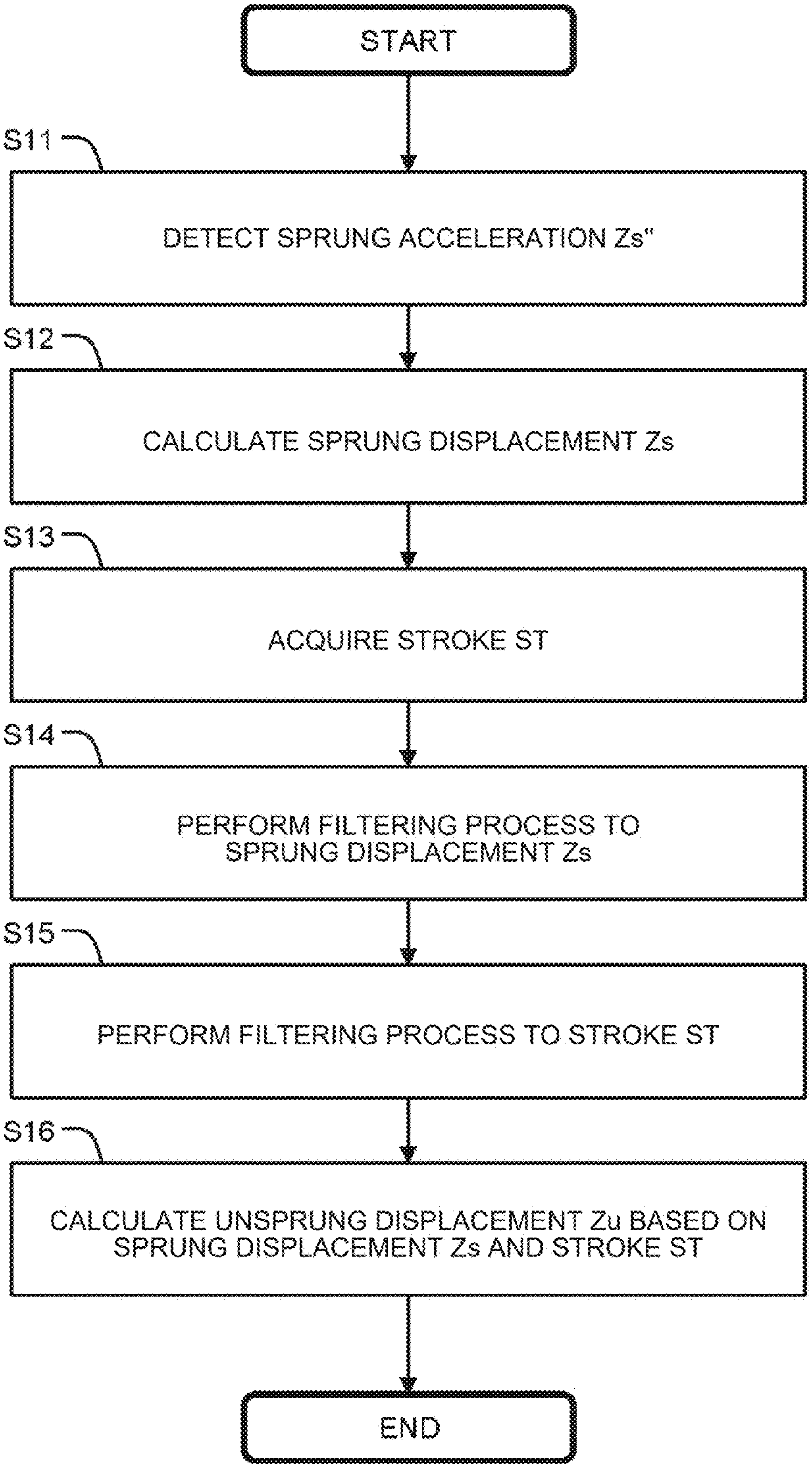
FIG. 3 is a flowchart showing an example of an unsprung displacement calculation process according to the embodiment.

FIG. 3 is a flowchart showing an example of an unsprung displacement calculation process.

In step S11, the sprung acceleration Zs" is detected by a sprung acceleration sensor 22 that is installed at the sprung structure 5. In step S12, the sprung acceleration Zs" is integrated twice, and thereby, the sprung displacement Zs is calculated.

In step S13, a stroke ST (=Zs−Zu) that is a relative displacement between the sprung structure 5 and the unsprung structure 4 is acquired. For example, the stroke ST is detected by a stroke sensor that is installed at the suspension 3. As another example, the stroke ST may be estimated based on the sprung acceleration Zs", by an observer that is configured based on a single-wheel two-degree-of-freedom model.

In step S14, a filtering process is performed to the time-series data of the sprung displacement Zs, for restraining the influence of sensor drift or the like. Similarly, in step S15, the filtering process is performed to the time-series data of the stroke ST. For example, the filter is a bandpass filter through which signal components in a particular frequency band pass. The particular frequency band may be set so as to include a sprung resonance frequency of the vehicle 1. For example, the particular frequency band is 0.3 Hz to 10 Hz.

In step S16, the difference between the sprung displacement Zs and the stroke ST is calculated as the unsprung displacement Zu.

Instead of step S14 and step S15, the filtering process may be performed to the time-series data of the unsprung displacement Zu that is calculated in step S16.

Furthermore, as another example, the unsprung acceleration Zu" may be detected by an unsprung acceleration sensor, and the unsprung displacement Zu may be calculated from the unsprung acceleration Zu".

Vehicle Control System

Exemplary Configuration

Figure 4:
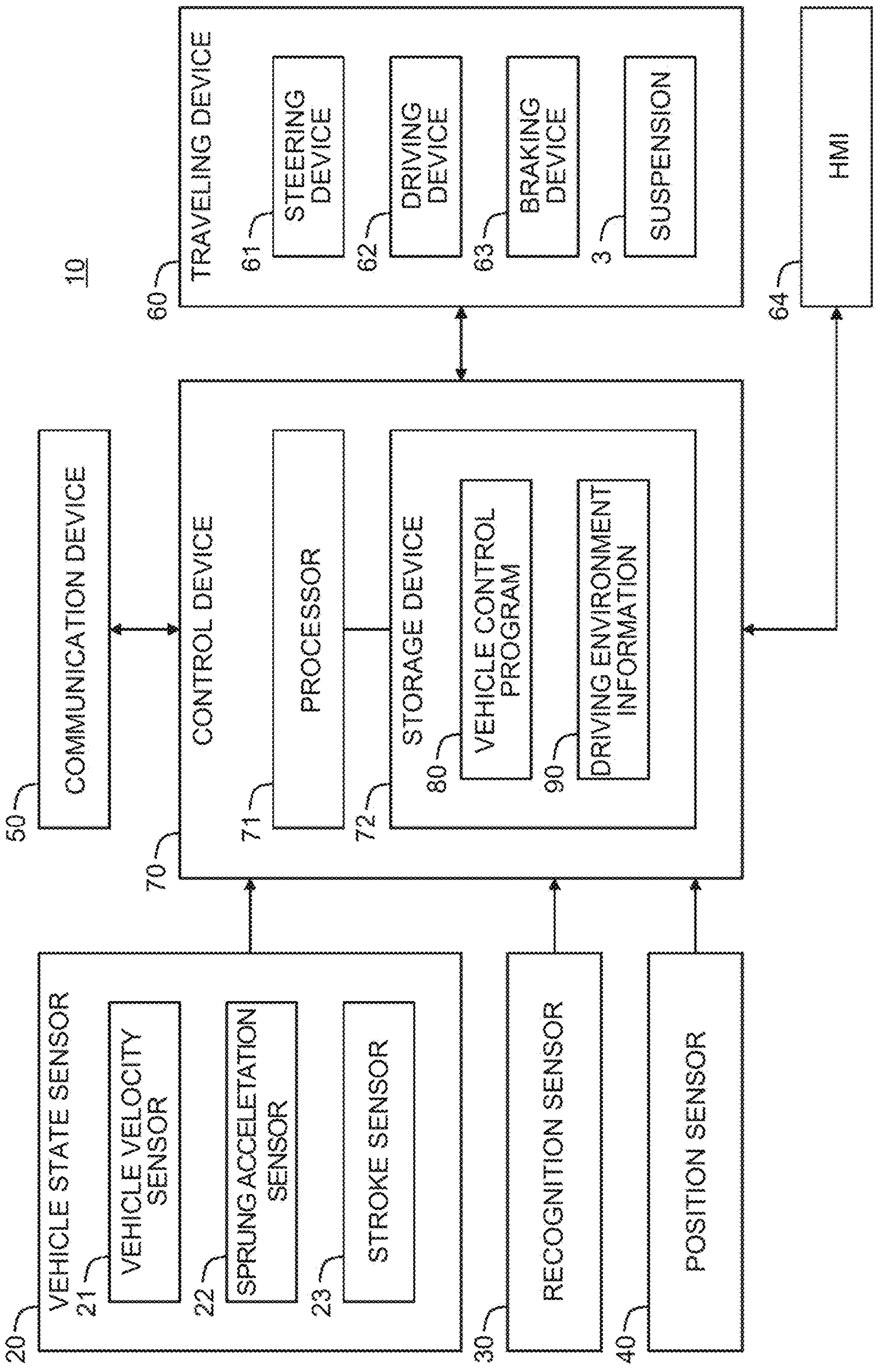
FIG. 4 is a block diagram showing an exemplary configuration of a vehicle control system according to the embodiment.

FIG. 4 is a block diagram showing an exemplary configuration of a vehicle control system 10 according to the embodiment. The vehicle control system 10 is equipped in the vehicle 1, and controls the vehicle 1. The vehicle control system 10 includes a vehicle state sensor 20, a recognition sensor 30, a position sensor 40, a communication device 50, a traveling device 60, an HMI 64, and a control device 70.

The vehicle state sensor 20 detects the state of the vehicle 1. The vehicle state sensor 20 includes a vehicle velocity sensor (wheel speed sensor) 21 that detects a vehicle velocity V of the vehicle 1, the sprung acceleration sensor 22 that detects the sprung acceleration Zs", and others. The vehicle state sensor 20 may include a stroke sensor 23 that detects the stroke ST. The vehicle state sensor 20 may include an unsprung acceleration sensor. In addition, the vehicle state sensor 20 includes a lateral acceleration sensor, a yaw rate sensor, a rudder angle sensor, and others.

The recognition sensor 30 recognizes (detects) the situation of the periphery of the vehicle 1. Examples of the recognition sensor include a camera, a laser imaging detection and ranging (LIDAR), and a radar.

The position sensor 40 detects the position and orientation of the vehicle 1. For example, the position sensor 40 includes a global navigation satellite system (GNSS).

The communication device 50 communicates with the exterior of the vehicle 1.

The traveling device 60 includes a steering device 61, a driving device 62, a braking device 63, and the suspension 3 (see FIG. 2). The steering device 61 turns the wheel 2. For example, the steering device 61 includes a power steering (EPS: Electric Power Steering) device. The driving device 62 is a dynamic power source that generates driving power. Examples of the driving device 62 include an engine, an electric motor, and an in-wheel motor. The braking device 63 generates braking power.

The HMI 64 presents a variety of information to a user by displaying or sound, and accepts a variety of inputs from the user. Typically, the user of the vehicle 1 is the driver of the vehicle 1. The HMI 64 is constituted by a display (e.g.; a multi-information display, a meter display, and a head-up display), a switch (e.g.; a steering switch and a door switch), a touch pad, a speakerphone, a touch screen, a microphone, and others.

The control device 70 is a computer that controls the vehicle 1. The control device 70 includes one or more processors 71 (referred to as merely a processor 71, hereinafter) and one or more storage devices 72 (referred to as merely a storage device 72, hereinafter). The control device 70 may include one or more electronic control units (ECUs).

The processor 71 executes various processes. For example, the processor 71 is constituted by a general-purpose processor, an application specific processor, a central processing unit (CPU), a graphics processing unit (GPU), an application specific integrated circuit (ASIC), a field-programmable gate array (FPGA), an integrated circuit, a conventional circuit, or one or more combinations of them. The processor 71 can be called a circuitry or a processing circuitry. The circuitry is hardware that includes programs for realizing functions of the control device 70, or hardware that executes functions of the control device 70.

The storage device 72 stores a variety of information necessary for the processor 71 to execute processes. For example, the storage device 72 is constituted by a recording medium such as a random-access memory (RAM), a read-only memory (ROM), a solid-state drive (SSD), and a hard disk drive (HDD).

The storage device 72 stores a vehicle control program 80. The vehicle control program 80 is a computer program for controlling the vehicle 1, and is executed by the processor 71. The vehicle control program 80 is constituted by an instruction set in which processes to be executed by the processor 71 are written. The vehicle control program 80 is recorded in a computer-readable recording medium. The processor 71 executes the vehicle control program 80, such that functions of the control device 70 are realized.

Driving Environment Information

Figure 5:
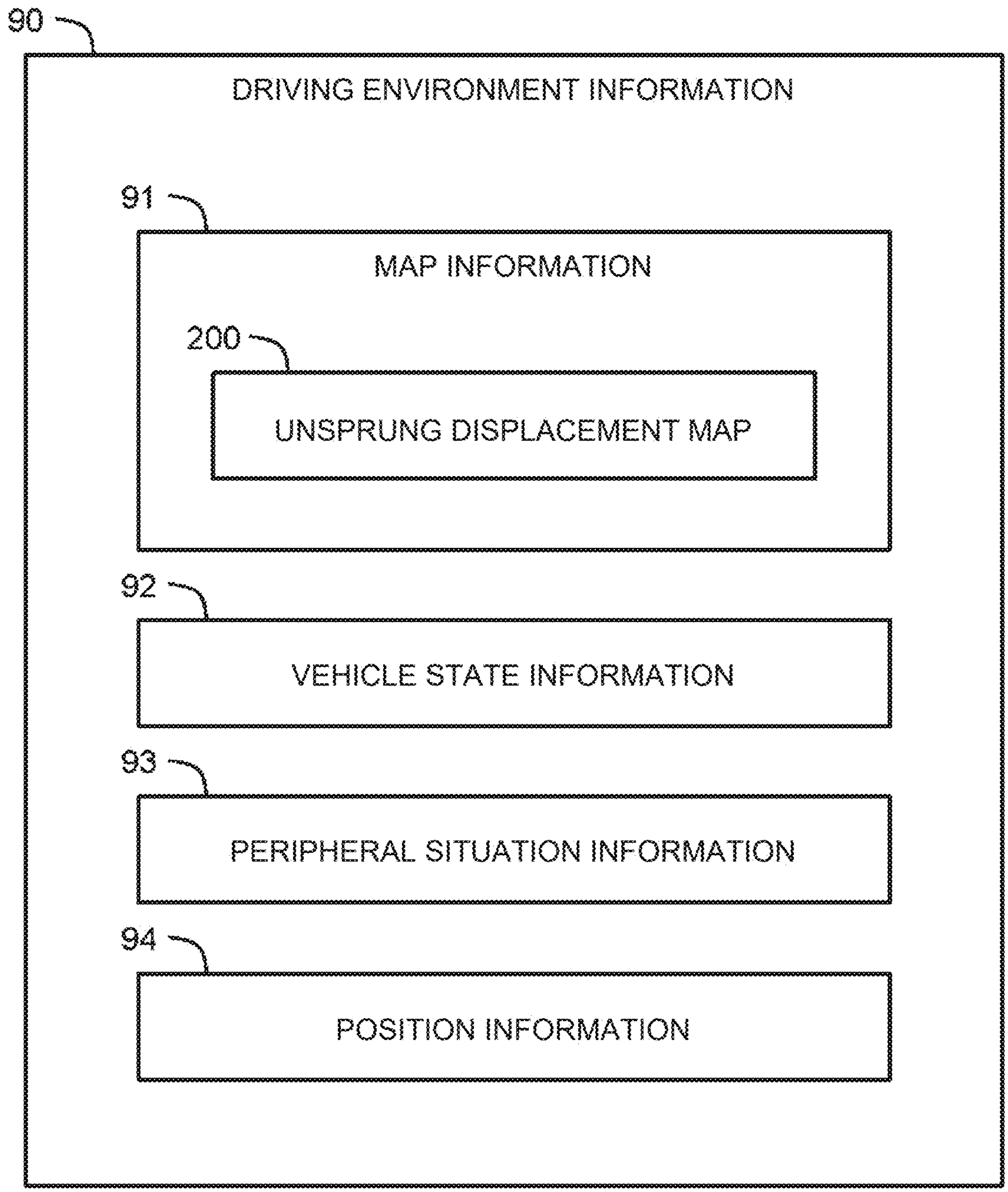
FIG. 5 is a block diagram showing an example of driving environment information according to the embodiment.

FIG. 5 is a block diagram showing an example of driving environment information 90 that indicates the driving environment of the vehicle 1. The driving environment information 90 is stored in the storage device 72. The driving environment information 90 includes map information 91, a vehicle state information 92, peripheral situation information 93, and position information 94.

The map information 91 includes a general navigation map. The map information 91 may indicate lane disposition, road form, and others. The map information 91 may include position information about white lines, traffic lights, signs, landmarks, and others. The map information 91 is obtained from a map database. The map database may be equipped in the vehicle 1, or may be stored in a management server in the exterior. In the case of the latter, the control device 70 communicates with the management server, and acquires the map information 91 that is needed.

The map information 91 further includes an "unsprung displacement map 200". Details of the unsprung displacement map 200 will be described later.

The vehicle state information 92 is information that indicates the state of the vehicle 1. The control device 70 acquires the vehicle state information 92 from the vehicle state sensor 20. For example, the vehicle state information 92 includes the vehicle velocity V, the sprung acceleration Zs", the stroke ST, the lateral acceleration, the yaw rate, and the rudder angle. The vehicle velocity V may be calculated from the vehicle position that is detected by the position sensor 40. The control device 70 may calculate the unsprung displacement Zu by the technique shown in FIG. 3. In that case, the vehicle state information 92 includes also the unsprung displacement Zu that is to be calculated by the control device 70.

The peripheral situation information 93 is information that indicates the situation of the periphery of the vehicle 1. The control device 70 recognizes the situation of the periphery of the vehicle 1, using the recognition sensor 30, and acquires the peripheral situation information 93. For example, the peripheral situation information 93 includes image information that is picked up by the camera. As another example, the peripheral situation information 93 includes point cloud information that is obtained by the LIDAR.

The peripheral situation information 93 further includes "physical body information" about a physical body in the periphery of the vehicle 1. Examples of the physical body include a pedestrian, a bicycle, another vehicle (a proceeding vehicle, a parked vehicle, or the like), a road constitution (a white line, a curb, a guardrail, a wall, a center divider, a roadside structure, or the like), a sign, a pole, and an obstacle. The physical body information indicates the position and velocity of the physical body relative to the vehicle 1. For example, the image information obtained by the camera is analyzed. Thereby, the physical body can be specified, and the relative position of the physical body can be calculated. Further, the physical body may be specified and the relative position and relative velocity of the physical body can be acquired, based on the point cloud information obtained by the LIDAR.

The position information 94 is information that indicates the position and orientation (vehicle moving direction) of the vehicle 1. The control device 70 acquires the position information 94 from the measurement result of the position sensor 40 such as the GNSS. As another example, the control device 70 may acquire the position information 94 by dead reckoning. Furthermore, as another example, the control device 70 may acquire the position information 94 with high accuracy, by a well-known self-position estimation process (localization) using the physical body information and the map information 91.

Vehicle Traveling Control

The control device 70 executes a vehicle traveling control to control the traveling of the vehicle 1. The vehicle traveling control includes a steering control, a driving control, and a braking control. The control device 70 executes the vehicle traveling control by controlling the traveling device 60 (the steering device 61, the driving device 62, and the braking device 63). The control device 70 may perform a driving assist control to assist the driving of the vehicle 1, based on the driving environment information 90. Examples of the driving assist control include a lane keeping control, a collision avoidance control, and an autonomous driving control.

The control device 70 controls the suspension 3. Typically, the control device 70 performs a vibration damping control to restrain the vibration of the vehicle 1, by controlling the suspension 3. For example, the control device 70 controls the actuator 3A, and thereby, generates the control force Fc in the vertical direction between the unsprung structure 4 and the sprung structure 5 (see FIG. 2). As another example, the control device 70 may perform the variable control of the damping force of the damper 3D. The vibration damping control includes a "preview control" described later.

Map Management System

Exemplary Configuration

Figure 6:
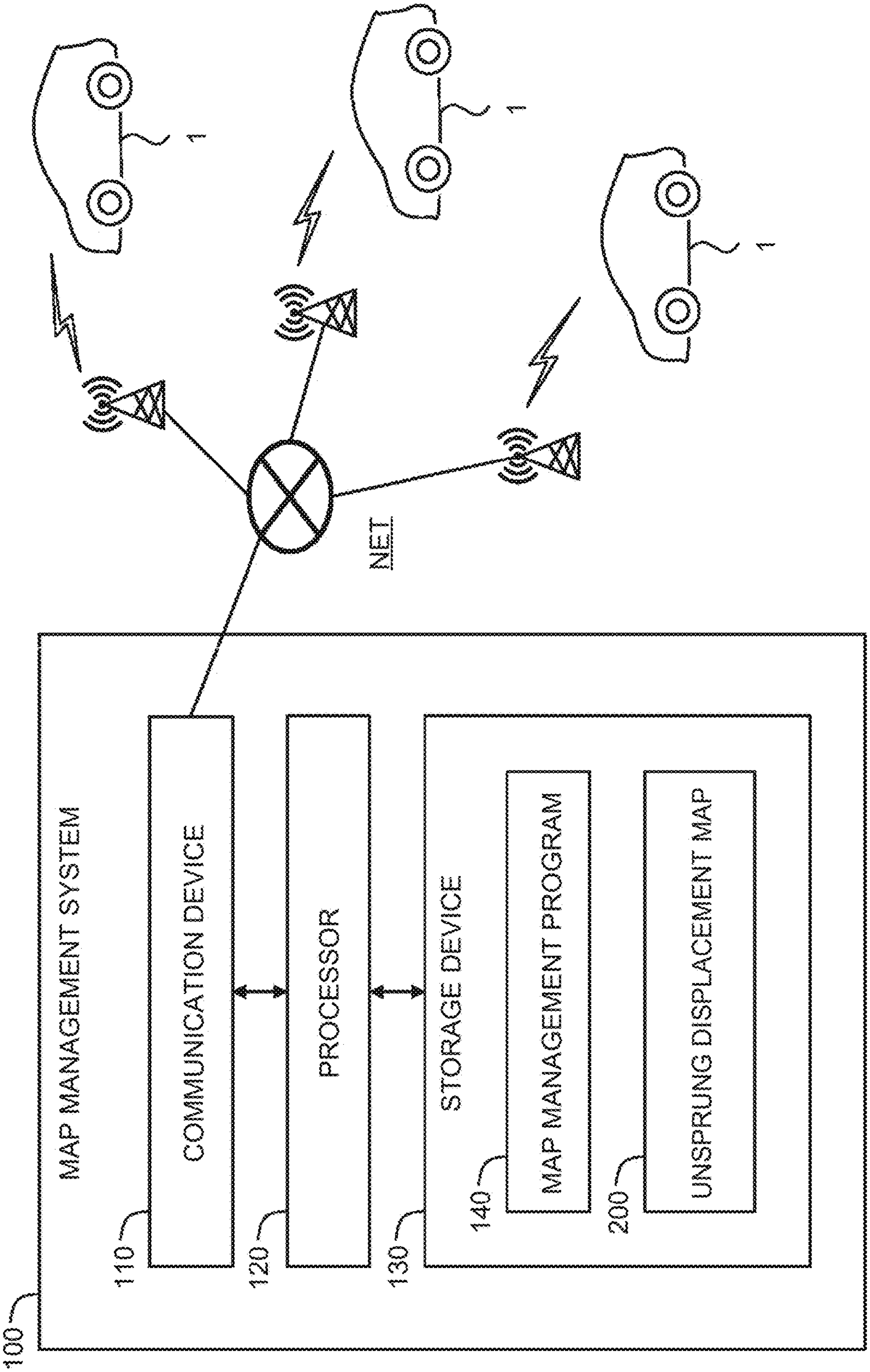
FIG. 6 is a block diagram showing an exemplary configuration of a map management system according to the embodiment.

FIG. 6 is a block diagram showing an exemplary configuration of a map management system 100 according to the embodiment. The map management system 100 is a computer that manages a variety of map information. The management of the map information includes the generation, update, provision, delivery, and others of the map information. Typically, the map management system 100 is a management server on the cloud. The map management system 100 may be a distributed system in which a plurality of servers performs distributed processing.

The map management system 100 includes a communication device 110. The communication device 110 is connected to a communication network NET. For example, the communication device 110 communicates with many vehicles 1 through the communication network NET.

The map management system 100 includes one or more processors 120 (referred to as merely a processor 120, hereinafter) and one or more storage devices 130 (referred to as merely a storage device 130, hereinafter).

The processor 120 executes various processes. For example, the processor 120 is constituted by a general-purpose processor, an application specific processor, a CPU, a GPU, an ASIC, an FPGA, an integrated circuit, a conventional circuit, or one or more combinations of them. The storage device 130 stores a variety of map information. The storage device 130 stores a variety of information necessary for the processor 120 to execute processes. For example, the storage device 130 is constituted by a recording medium such as a RAM, a ROM, an SSD, and an HDD.

The storage device 130 stores a map management program 140. The map management program 140 is a computer program for map management, and is executed by the processor 120. The map management program 140 is constituted by an instruction set in which processes to be executed by the processor 120 are written. The map management program 140 is recorded in a computer-readable recording medium. The processor 120 executes the map management program 140, such that functions of the map management system 100 are realized.

The processor 120 communicates with the vehicle control system 10 of the vehicle 1 through the communication device 110. The processor 120 collects a variety of information from the vehicle control system 10, and generates and updates the map information based on the collected information. The processor 120 delivers the map information to the vehicle control system 10. The processor 120 provides the map information in response to a request from the vehicle control system 10.

Unsprung Displacement Map

The map information that is managed by the map management system 100 includes the "unsprung displacement map (vertical motion parameter map) 200". The unsprung displacement map 200 is a map about the unsprung displacement Zu (vertical motion parameter). The unsprung displacement map 200 is stored in the storage device 130.

Figures 7A, 7B:
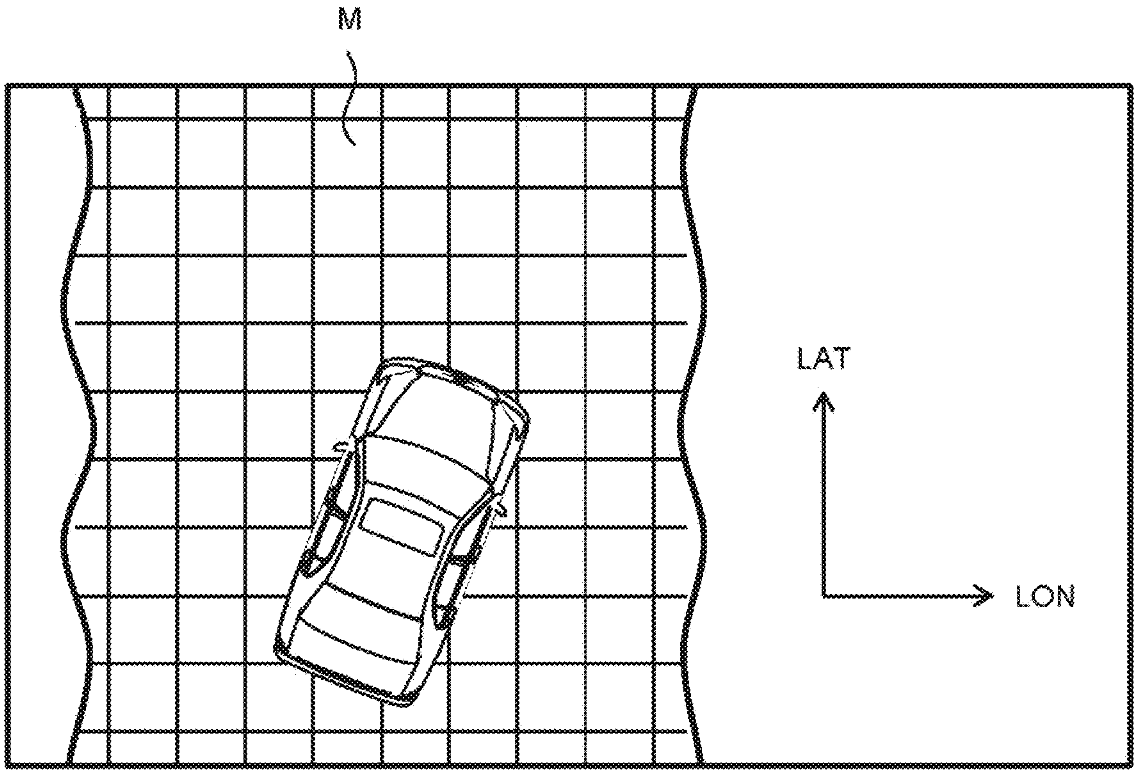
FIG. 7A is a conceptual diagram for describing an unsprung displacement map according to the embodiment.
FIG. 7B is a conceptual diagram for describing the unsprung displacement map according to the embodiment.

FIG. 7A and FIG. 7B are conceptual diagrams for describing the unsprung displacement map 200. For example, an absolute coordinate system on a horizontal plane is defined by a latitude direction and a longitude direction, and a position is defined by a latitude LAT and a longitude LON. In the unsprung displacement map 200, at least the unsprung displacement Zu is associated with the position (LAT, LON) on the map. In other words, the unsprung displacement map 200 expresses the unsprung displacement Zu as a function of at least the position (LAT, LON). In the unsprung displacement map 200, a "number N of times of traveling" may be associated with the position (LAT, LON) on the map. As described later, the unsprung displacement Zu at a certain position (LAT, LON) is evaluated based on information obtained in the vehicle 1 that actually traveled at the certain position. The number N of times of traveling at a certain position (LAT, LON) indicates the number of times that the vehicle 1 involved in the evaluation of the unsprung displacement Zu traveled at the certain position. Generally, the unsprung displacement Zu at a certain position (LAT, LON) has a higher accuracy as the number N of times of traveling at the certain position is larger. This is because the amount of data for evaluating the unsprung displacement Zu is larger as the number N of times of traveling is larger. The number N of times of traveling can be replaced with "the number N of times of evaluation" or "the number N of times of update".

A road region may be segmented in a mesh pattern, on the horizontal plane. That is, the road region may be segmented into a plurality of unit areas M, on the horizontal plane. For example, the unit area M has a rectangular form. For example, the unit area M is a square shape in which the length of one side is 10 cm. The unsprung displacement map 200 shows the correspondence relation between the position of the unit area M and the unsprung displacement Zu. The position of the unit area M may be defined by a representative position (e.g.: a center position) in the unit area M, or may be defied by the range (a latitude range and a longitude range) of the unit area M. For example, the unsprung displacement Zu of the unit area M is the average value of unsprung displacements Zu acquired in the unit area M. The resolution of the unsprung displacement map 200 increases as the unit area M is smaller. The optimization of the resolution of the unsprung displacement map 200 will be described later in detail.

The unsprung displacement map 200 may be constituted by a plurality of layers stratified according to the number N of times of traveling. For example, the unsprung displacement map 200 may be constituted by a layer showing map data in which the number N of times of traveling is 0 or more and less than 10, a layer showing map data in which the number N of times of traveling is 10 or more and less than 30, and a layer showing map data in which the number N of times of traveling is 30 or more. By constituting the unsprung displacement map 200 by a plurality of layers in this way, it is possible to distinguish map data in which the accuracy of the unsprung displacement Zu is different.

It is known that the unsprung displacement Zu is different depending on the velocity of the vehicle 1. Therefore, the unsprung displacement map 200 may be constituted by a plurality of layers stratified according to the velocity range of the vehicle 1. For example, the unsprung displacement map 200 may be constituted by a layer showing map data for a low velocity range of 0 km/h or higher and lower than 30 km/h, a layer showing map data for a middle velocity range of 30 km/h or higher and lower than 60 km/h, and a layer showing map data for a high velocity range of 60 km/h or higher. By constituting the unsprung displacement map 200 by a plurality of layers in this way, it is possible to manage the unsprung displacement Zu with higher accuracy depending on the velocity of the vehicle 1 for each of the layers.

Map Generation-Update Process

The processor 120 collects information from many vehicles 1 through the communication device 110. Then, the processor 120 generates and updates the unsprung displacement map 200 based on the information collected from the many vehicles 1. An example of the map generation-update process will be described below in more detail.

The position on the unsprung displacement map 200 is a position through which the wheel 2 has passed. The position of each wheel 2 is calculated based on the position information 94. Specifically, the relative position relation between a reference point of the vehicle position in the vehicle 1 and each wheel 2 is known information. The position of each wheel 2 can be calculated based on the relative position relation and the vehicle position shown by the position information 94.

The unsprung displacement Zu is calculated by the technique shown in FIG. 3. That is, the sprung displacement Zs and the stroke ST are obtained using the vehicle state sensor 20 equipped in the vehicle 1. For convenience sake, the sprung displacement Zs and the stroke ST are referred to as "sensor-based information". The unsprung displacement Zu is calculated based on the sensor-based information.

For example, during the traveling of the vehicle 1, the control device 70 of the vehicle control system 10 calculates the unsprung displacement Zu in real time, based on the sensor-based information. The control device 70 associates the wheel position and unsprung displacement Zu at the same timing. Then, the control device 70 sends a set of the time-series data of the wheel position and the time-series data of the unsprung displacement Zu, to the map management system 100. The processor 120 of the map management system 100 generates and updates the unsprung displacement map 200 based on the time-series data of the wheel position and the time-series data of the unsprung displacement Zu.

As another example, the control device 70 of the vehicle control system 10 associates the wheel position and sensor-based information at the same timing. Then, the control device 70 sends a set of the time-series data of the wheel position and the time-series data of the sensor-based information, to the map management system 100. The processor 120 of the map management system 100 calculates the unsprung displacement Zu based on the received sensor-based information. The processor 120 generates and updates the unsprung displacement map 200 based on the time-series data of the wheel position and the time-series data of the unsprung displacement Zu.

In the case where the unsprung displacement Zu is calculated in the map management system 100, there is no constraint about processing time, and therefore, a filtering process can be performed using a zero-phase filter. By using the zero-phase filter, phase shifting can be prevented.

Figure 8:
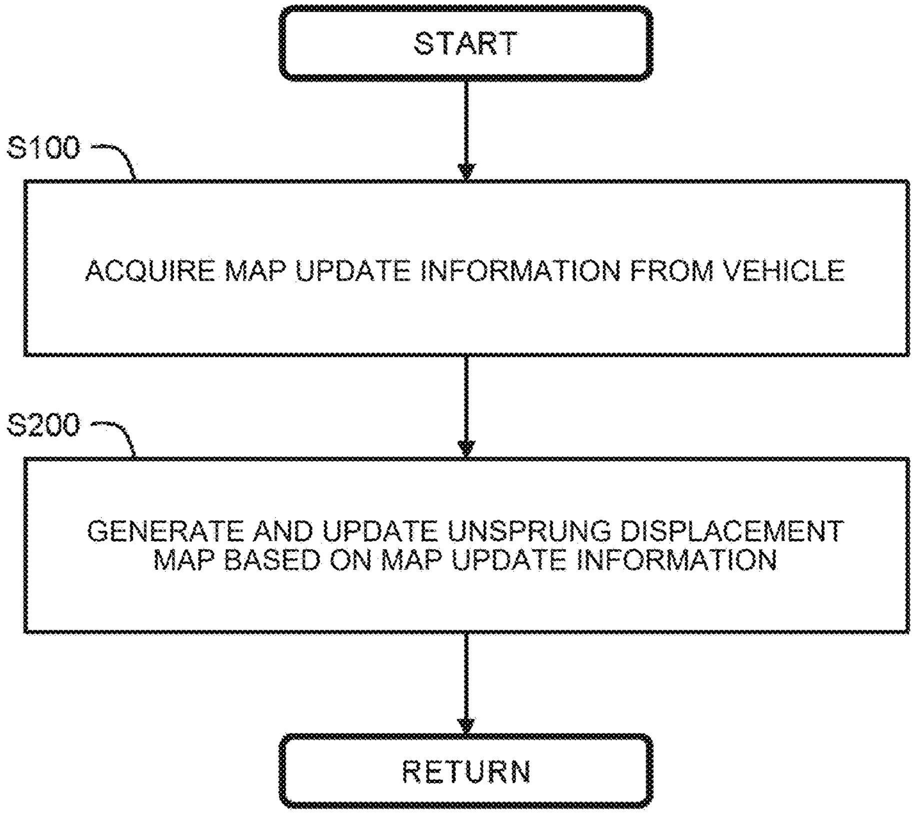
FIG. 8 is a flowchart schematically showing a map generation-update process according to the embodiment.

FIG. 8 is a flowchart schematically showing the map generation-update process according to the embodiment.

In step S100, the processor 120 of the map management system 100 acquires "map update information" from the vehicle 1 (vehicle control system 10) through the communication device 110. The map update information includes the time-series data of the position (wheel position) of the vehicle 1. Further, the map update information includes the time-series data of the sensor-based information (e.g.: the sprung displacement Zs and the stroke ST) that is necessary for calculating the unsprung displacement Zu. Alternatively, the map update information may include the time-series data of the unsprung displacement Zu calculated by the control device 70 of the vehicle control system 10.

In step S200, the processor 120 of the map management system 100 generates and updates the unsprung displacement map 200 based on the map update information.

Modification

The vehicle control system 10 of the vehicle 1 may hold a database for the unsprung displacement map 200, and may generate and update the unsprung displacement map 200 in the vehicle control system 10. That is, the map management system 100 may be included in the vehicle control system 10.

Preview Control Using Unsprung Displacement Map

The control device 70 of the vehicle control system 10 communicates with the map management system 100 through the communication device 50. The control device 70 acquires the unsprung displacement map 200 for an area including the current position of the vehicle 1, from the map management system 100. The unsprung displacement map 200 is stored in the storage device 72. Moreover, based on the unsprung displacement map 200, the control device 70 executes the "preview control" that is a kind of vibration damping control.

Figure 9:
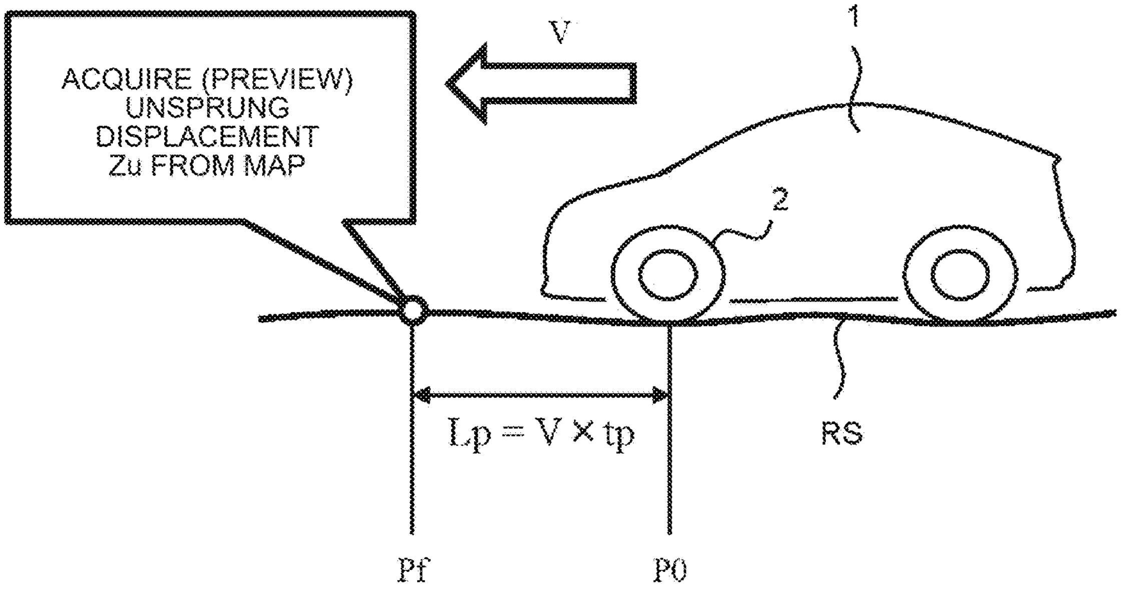
FIG. 9 is a conceptual diagram for describing a preview control using the unsprung displacement map according to the embodiment.
Figure 10:
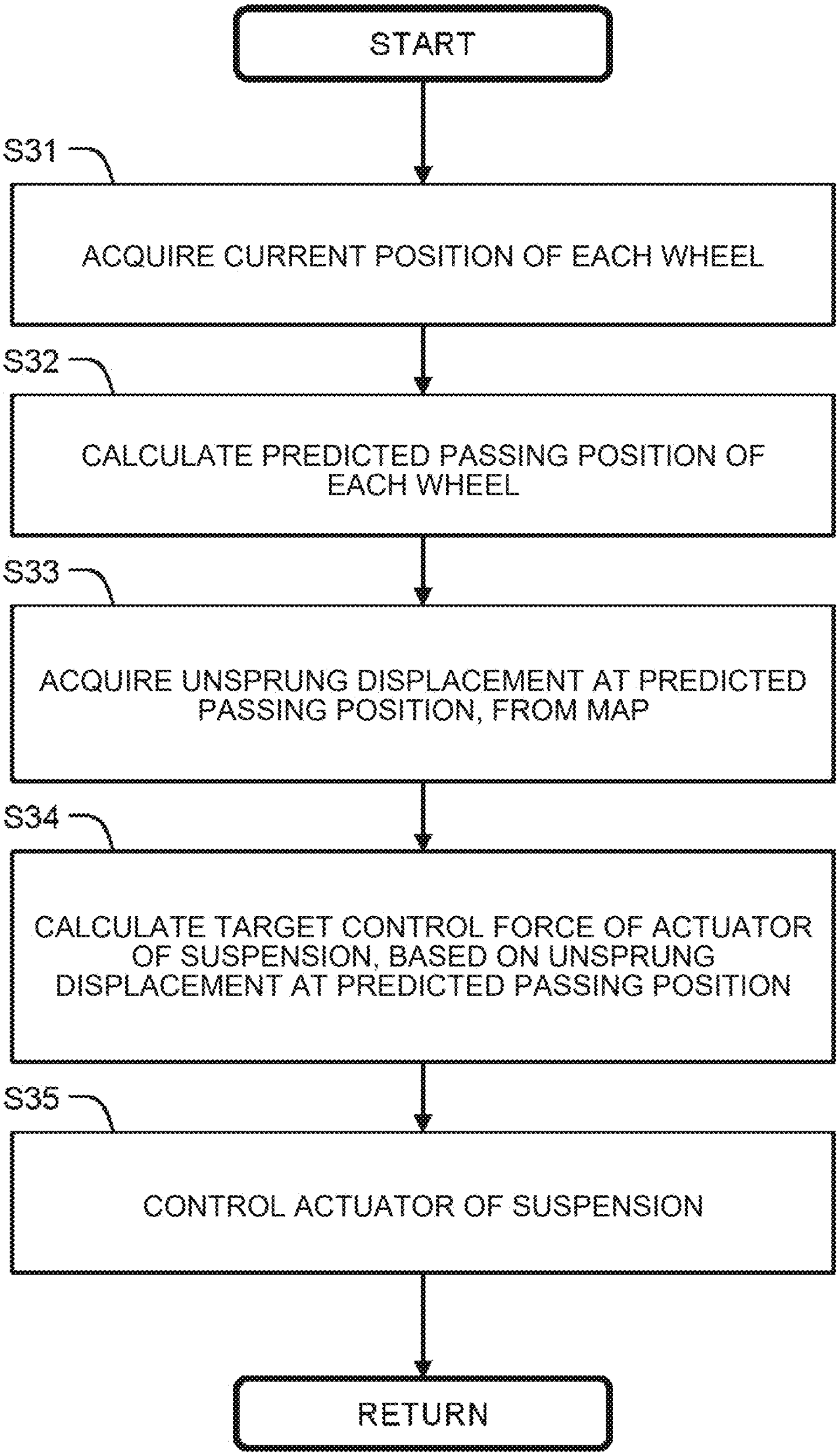
FIG. 10 is a flowchart showing the preview control using the unsprung displacement map according to the embodiment.

FIG. 9 is a conceptual diagram for describing the preview control. FIG. 10 is a flowchart showing the preview control. The preview control will be described with reference to FIG. 9 and FIG. 10.

In step S31, the control device 70 acquires a current position P0 of each wheel 2. The relative position relation between the reference point of the vehicle position in the vehicle 1 and each wheel 2 is known information. The position of each wheel 2 can be calculated based on the relative position relation and the vehicle position shown by the position information 94.

In step S32, the control device 70 calculates a predicted passing position Pf of the wheel 2 after a preview time tp. For example, the preview time tp is set so as to be more than or equal to a time required for a calculation process and a communication process that are necessary before the activation of the actuator 3A of the suspension 3. The preview time tp may be fixed, or may be varied depending on the situation. The preview distance Lp is given by the product of the preview time tp and the vehicle velocity V. The predicted passing position Pf is a position that is the preview distance Lp before the current position P0. As a modification, the control device 70 may calculate an expected traveling route based on the vehicle velocity V and the rudder angle of the wheel 2, and may calculate the predicted passing position Pf based on the expected traveling route.

In step S33, the control device 70 reads the unsprung displacement Zu at the predicted passing position Pf, from the unsprung displacement map 200.

In step S34, the control device 70 calculates a target control force Fc_t of the actuator 3A of the suspension 3, based on the unsprung displacement Zu at the predicted passing position Pf. For example, the target control force Fc_t is calculated as follows.

The motion equation about the sprung structure 5 (see FIG. 2) is expressed by the following expression (1).

$$m \cdot Zs'' = C(Zu' - Zs') + K(Zu - Zs) - Fc \quad (1)$$

In the expression (1), m is the mass of the sprung structure 5, C is the attenuation coefficient of the damper 3D, K is the spring constant of the spring 3S, and Fc is the control force Fc in the vertical direction that is generated by the actuator 3A. In the case where the vibration of the sprung structure 5 is completely canceled by the control force Fc (Zs"=0, Zs'=0, Zs=0), the control force Fc is expressed by the following expression (2).

$$Fc = C \cdot Zu' + K \cdot Zu \quad (2)$$

The control force Fc that causes at least the vibration damping effect is expressed by the following expression (3).

$$Fc = \alpha \cdot C \cdot Zu' + \beta \cdot K \cdot Zu \quad (3)$$

In the expression (3), a gain α is more than 0 and 1 or less, and a gain β is more than 0 and 1 or less. In the case where the derivative term in the expression (3) is omitted, the control force Fc that causes at least the vibration damping effect is expressed by the following expression (4).

$$Fc = \beta \cdot K \cdot Zu \quad (4)$$

The control device 70 calculates the target control force Fc_t in accordance with the expression (3) or the expression (4). That is, the control device 70 calculates the target control force Fc_t by substituting the unsprung displacement Zu at the predicted passing position Pf into the expression (3) or the expression (4).

In step S35, the control device 70 controls the actuator 3A such that the target control force Fc_t is generated at the timing when the wheel 2 passes through the predicted passing position Pf. The timing when the wheel 2 passes through the predicted passing position Pf is obtained from the preview time tp.

By the above-described preview control using the unsprung displacement map 200, it is possible to effectively restrain the vibration of the vehicle 1 (sprung structure 5).

Navigation for Traveling Route

The control device 70 of the vehicle control system 10 has a navigation function to perform the navigation for the traveling route of the vehicle 1 (objective vehicle). In the navigation function, the control device 70 accepts the input of a destination by the user, through the HMI 64. In response to the input of the destination, the control device 70 selects the traveling route from the current place of the vehicle 1 to the destination. Then, the control device 70 starts the navigation for the traveling route through the HMI 64. Typically, the control device 70 displays the selected traveling route on the display, and prompts the user to drive the vehicle 1 along the traveling route. The vehicle 1 may be an autonomous driving vehicle. In this case, the traveling route is a route on which the vehicle 1 travels by autonomous driving.

The preview control when the vehicle 1 travels on the traveling route depending on the navigation function will be discussed. In the preview control, the vehicle 1 is controlled based on the unsprung displacement Zu that is to be acquired from the map data about the unsprung displacement map 200. Accordingly, for executing the preview control, the unsprung displacement Zu needs to be enabled to be acquired from the map data about the unsprung displacement map 200. However, it is difficult to create the map data about all positions on the map. Practically, positions about each of which there is the map data and for each of which the preview control can be executed and positions about each of which there is no map data and for which the preview control cannot be executed can exist in a mixed manner. When the traveling route of the vehicle 1 includes many positions about each of which there is no map data, the preview control cannot be executed during the traveling of the vehicle 1 on the traveling route, in many cases. As a result, the preview control cannot sufficiently improve the comfortableness of the vehicle 1.

Hence, for improving the comfortableness of the vehicle 1, the embodiment proposes the vehicle control system 10 that makes it possible to select a traveling route of the vehicle 1 on which the preview control is likely to be executed.

In the navigation function, the control device 70 of the vehicle control system 10 according to the embodiment more preferentially select, as the traveling route of the vehicle 1, a route for which the amount of the map data about the unsprung displacement map 200 is large, from a plurality of routes from the current place of the vehicle 1 to the destination, than a route for which the amount of the map data is small. For example, from a plurality of routes including a first route and a second route for which the amount of the map data about the unsprung displacement map 200 is smaller than for the first route, the first route is more preferentially selected than the second route. That is, a route for which the amount of the map data is larger is selected as the traveling route of the vehicle 1. Whether the amount of the map data for a certain route is larger than that for another route can be evaluated from some standpoints described below.

Standpoints for Evaluating Whether Amount of Map Data for Certain Route is Larger than that for Another Route In a first standpoint for evaluating whether the amount of the map data for a certain route is larger than that for another route, the ratio of a section with the map data in the route is used. It can be said that the section with the map data is a section for which the unsprung displacement Zu (vertical motion parameter) can be acquired from the map data. In the first standpoint, the ratio (referred to as a "map existence ratio", hereinafter) of the section with the map data is calculated for each route. Whether the amount of the map data for a certain route is larger than that for another route can be evaluated by the mutual comparison of the map existence ratio. That is, the route for which the amount of the map data is larger is a route for which the map existence ratio is higher. Whether the map data exists for a certain spot on the route may be determined based on whether the unsprung displacement Zu is associated with the position of at least one unit area M in the certain spot.

In the first standpoint, in the case where the unsprung displacement map 200 is constituted by a plurality of layers, the map existence ratio may be calculated for each of the layers. Whether the amount of the map data for a certain route is larger than that for another route may be evaluated by the comparison of the total of the map existence ratios of the layers. The total of the map existence ratios of the layers may be a weighted sum that includes weights corresponding to the layers. For example, a case where the unsprung displacement map 200 is constituted by a plurality of layers stratified according to the number N of times of traveling will be discussed. In this case, the total of the map existence ratios may be calculated by such a weighted sum that a larger weight is given to a layer for which the number N of times of traveling is larger. Thereby, the map existence ratios can be compared in consideration of the number N of times of traveling also. That is, the route for which the amount of the map data is larger is a route for which the map existence ratio about the map data in which the number N of times of traveling is larger is higher.

In a second standpoint for evaluating whether the amount of the map data for a certain route is larger than that for another route, the length of a section with the map data in the route is used. In the second standpoint, the length (referred to as a "map existence distance", hereinafter) of the section with the map data is calculated for each route. Whether the amount of the map data for a certain route is larger than that for another route can be evaluated by the mutual comparison of the map existence distance. That is, the route for which the amount of the map data is larger is a route for which the map existence distance is longer.

In the second standpoint also, in the case where the unsprung displacement map 200 is constituted by a plurality of layers, the map existence distance may be calculated for each of the layers. Whether the amount of the map data for a certain route is larger than that for another route may be evaluated by the comparison of the total of the map existence distances of the layers. The total of the map existence distances of the layers may be a weighted sum that includes weights corresponding to the layers.

In a third standpoint for evaluating whether the amount of the map data for a certain route is larger than that for another route, the number N of times of traveling per unit distance in the route is used. As the number N of times of traveling for a certain spot is larger, the amount of data constituting the map data for the certain spot is larger. Accordingly, it is thought that the amount of the map data for the route is larger as the number N of times of traveling per unit distance in the route is larger. In the third standpoint, the number N of times of traveling per unit distance is calculated for each route. Whether the amount of the map data for a certain route is larger than that for another route can be evaluated by the mutual comparison of the number N of times of traveling per unit distance. That is, the route for which the amount of the map data is larger is a route for the number N of times of traveling per unit distance is larger. In the calculation of the number N of times of traveling per unit distance, the number N of times of traveling for a certain spot on the route may be the average or total of the numbers N of times of traveling about unit areas M included in the certain spot. Alternatively, the maximum of the numbers N of times of traveling about unit areas M included in the certain spot may be adopted.

The above standpoints may be combined. For example, a case where the first standpoint and the third standpoint are combined will be discussed. In this case, the map existence ratio and the number N of times of traveling per unit distance are calculated for each route. Whether the amount of the map data for a certain route is larger than that for another route is evaluated by the mutual comparison of the map existence ratio and the number N of times of traveling per unit distance. This comparison may be performed by calculating an evaluation value using the map existence ratio and the number N of times of traveling per unit distance as arguments. That is, the route for which the map data is larger is a route for which the calculated evaluation value is higher. The configuration of the evaluation value may be appropriately determined depending on an environment in which the embodiment is applied. For example, the evaluation value is the linear sum of results from multiplying the map existence ratio and the number N of times of traveling per unit distance by coefficients respectively. Alternatively, as the mutual comparison of the map existence ratio and the number N of times of traveling per unit distance, the comparison of the map existence ratio and the comparison of the number N of times of traveling per unit distance may be performed in stages. For example, first, by the comparison of the map existence ratio, it is determined whether there is a gap of a predetermined value or more between one map existence ratio and the other map existence ratio. In the case where there is the gap of the predetermined value or more, a route for which the map existence ratio is higher is adopted as the route for which the amount of the map data is larger. On the other hand, in the case there is no gap of the predetermined value or more, the comparison of the number N of times of traveling per unit distance is next performed. Then, a route for which the number N of times of traveling per unit distance is larger is adopted as the route for which the amount of the map data is larger.

In the navigation function, from one of the above standpoints, the control device 70 of the vehicle control system 10 according to the embodiment evaluates whether the amount of the map data for a certain route is larger than that for another route. Then, as the traveling route of the vehicle 1, the control device 70 more preferentially selects the route for which the amount of the map data is large than the route for which the amount of the map data is small.

Processing Flow

Figure 11:
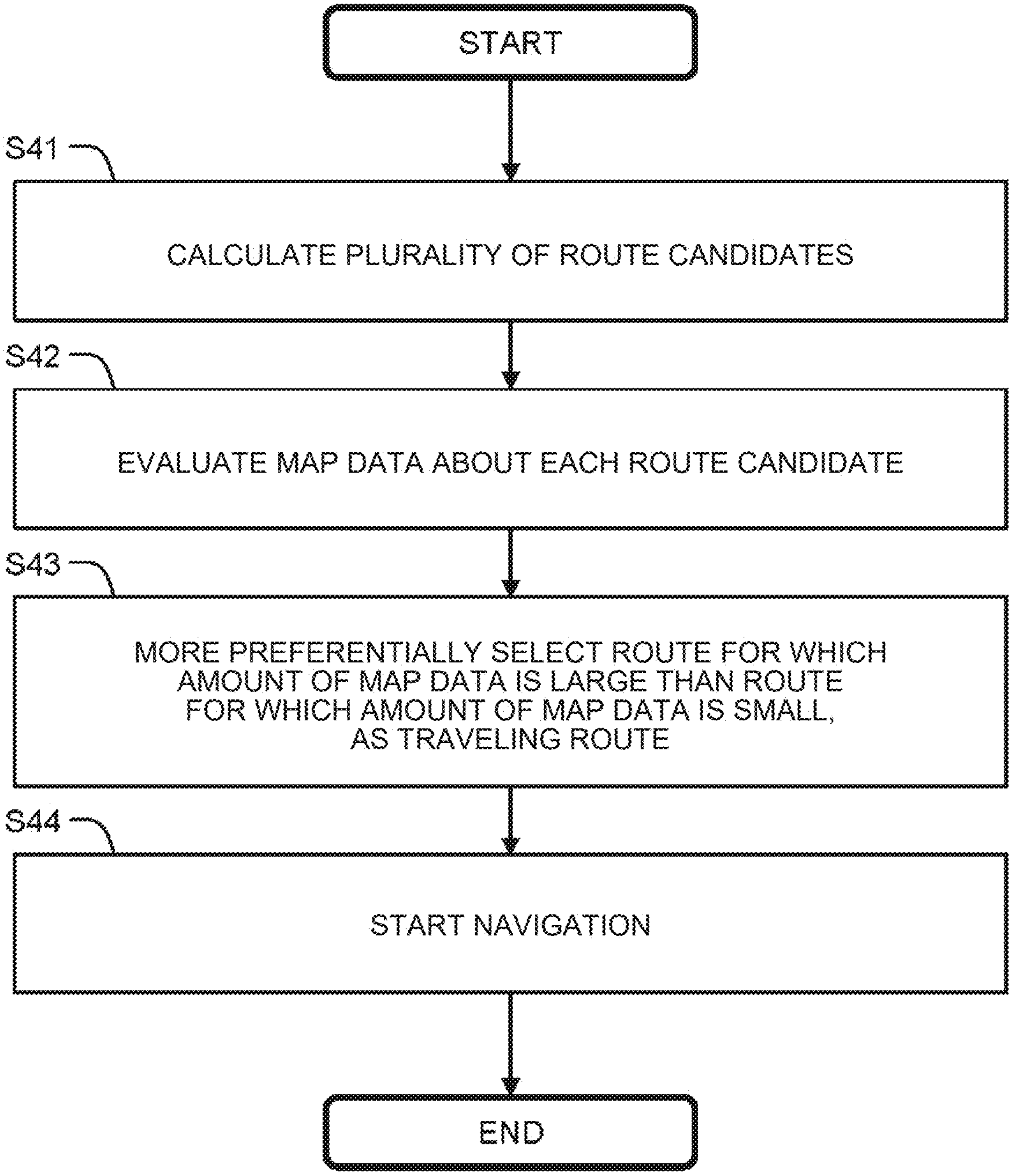
FIG. 11 is a flowchart showing an example of a processing flow that is executed by a control device of the vehicle control system according to the embodiment, relating to a navigation function.

FIG. 11 is a flowchart showing an example of a processing flow that is executed by the control device 70 (more specifically, the processor 71), relating to the navigation function. The processing flow shown in FIG. 11 is started when the control device 70 accepts the input of the destination by the user.

In step S41, the control device 70 calculates a plurality of route candidates from the current place of the vehicle 1 to the destination. In the embodiment, the technique for calculating the route candidates is not particularly limited. For example, as the route candidates, the control device 70 calculates all route candidates that allow the arrival at the destination without turning back.

In step S42, the control device 70 evaluates the map data about each of the calculated route candidates. The content of the evaluation of the map data about each route candidate is determined depending on the standpoint that is employed from the above-described standpoints. For example, in the case where the first standpoint is employed, the map existence ratio of each route candidate is calculated by the evaluation of the map data. For example, in the case where the second standpoint is employed, the map existence distance of each route candidate is calculated by the evaluation of the map data. For example, in the case where the third standpoint is employed, the number N of times of traveling per unit distance of each route candidate is calculated by the evaluation of the map data. For example, in the case where the combination of the first standpoint and the third standpoint is employed, the map existence ratio and the number N of times of traveling per unit distance are calculated for each route candidate, by the evaluation of the map data.

In step S43, from the route candidates, the control device 70 more preferentially selects a route for which the amount of the map data is large than a route for which the amount of the map data is small, as the traveling route of the vehicle 1. Whether the amount of the map data for a certain route is larger than that for another route is evaluated based on the evaluation result for the map data in step S42. For example, in the case where the first standpoint is employed, whether the amount of the map data is larger is evaluated based on the map existence ratio. In this case, from the route candidates, the control device 70 more preferentially selects a route for which the map existence ratio is high than a route for which the map existence ratio is low, as the traveling route of the vehicle 1. For example, in the case where the second standpoint is employed, whether the amount of the map data is larger is evaluated based on the map existence distance. In this case, from the route candidates, the control device 70 more preferentially selects a route for which the map existence distance is long than a route for which the map existence distance is short, as the traveling route of the vehicle 1. For example, in the case where the third standpoint is employed, whether the amount of the map data is larger is evaluated based on the number N of times of traveling per unit distance. In this case, from the route candidates, the control device 70 more preferentially selects a route for which the number N of times of traveling per unit distance is large than a route for which the number N of times of traveling per unit distance is small, as the traveling route of the vehicle 1.

Typically, the traveling route that is selected in step S43 is a route candidate for which the amount of the map data is largest among the route candidates. For example, in the case where the first standpoint is employed, the traveling route that is selected is typically a route candidate for which the map existence ratio is highest. However, the more preferentially selecting, as the traveling route of the vehicle 1, the route for which the amount of the map data is large than the route for which the amount of the map data is small does not always need to be selecting, as the traveling route of the vehicle 1, the route for which the amount of the map data is largest. That is, the selection of the traveling route of the vehicle 1 may be performed in consideration of an index different from the map data, as exemplified by the required time, the distance to the destination, or the fee. For example, the control device 70 may be configured to consider the required time, and not to select a route candidate for which the required time is extremely long, as the traveling route of the vehicle 1, from the route candidates. In this case, when the required time of the route candidate for which the amount of the map data is largest is extremely long, the route candidate for which the amount of the map data is largest is not selected as the traveling route of the vehicle 1. The control device 70 more preferentially selects a route for which the amount of the map data is large than a route for which the amount of the map data is small, as the traveling route of the vehicle 1, from route candidates for each of which the required time is not extremely long, for example, from route candidates for each of which the required time is less than a threshold.

In step S44, the control device 70 starts the navigation for the selected traveling route. The control device 70 may accept a response from the user about whether the user permits the start of the navigation for the selected traveling route. At this time, to the user, the control device 70 may present, through the HMI 64, the evaluation result (the map existence ratio, the map existence distance, or the number N of times of traveling per unit distance) for the map data about the selected traveling route, in addition to information about the required time, distance, fee and others for the selected traveling route. The user can determine whether to start the navigation for the selected traveling route, after confirming the evaluation result for the map data.

As described above, the control device 70 according to the embodiment executes the process about the navigation function. As a modification, instead of calculating the route candidates, the control device 70 may previously read the unsprung displacement map 200, and may select the traveling route of the vehicle 1 such that the vehicle 1 more preferentially passes through a spot for which the amount of the map data is large than through a spot for which the amount of the map data is small. In this case, the control device 70 skips the processes in step S41 and step S42 shown in FIG. 11, and executes the process in step S43.

Specific Example

Figures 12A, 12B:
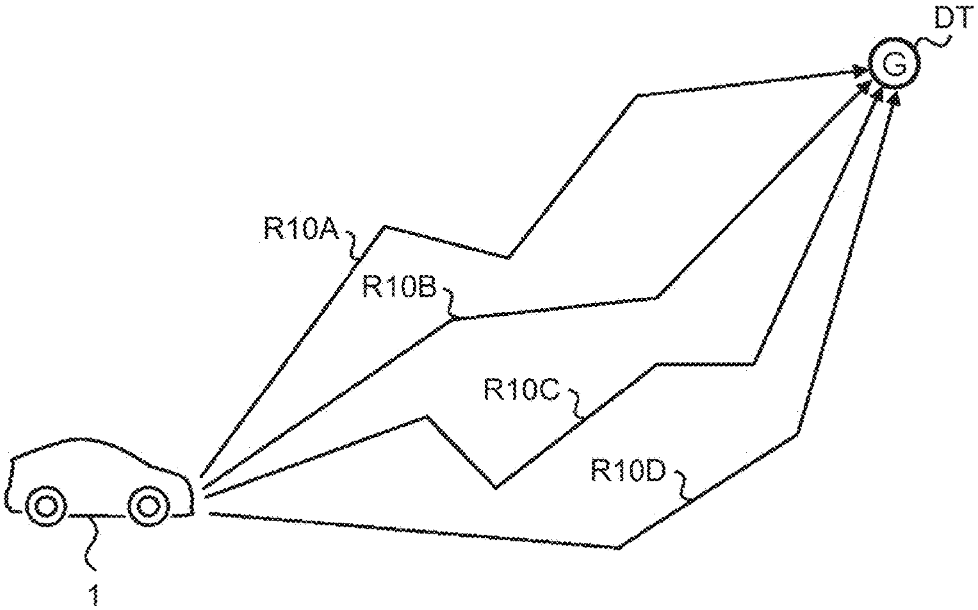
FIG. 12A is a conceptual diagram showing a specific example of the navigation function that is executed by the control device of the vehicle control system according to the embodiment.
FIG. 12B is a conceptual diagram showing a specific example of the navigation function that is executed by the control device of the vehicle control system according to the embodiment.

Each of FIG. 12A and FIG. 12B is a conceptual diagram showing a specific example of the navigation function that is executed by the control device 70 of the vehicle control system 10 according to the embodiment. In the example shown in FIG. 12A, the control device 70 calculates four route candidates R10 (an A-route R10A, a B-route R10B, a C-route R10C, and a D-route R10D) from the current place of the vehicle 1 to a destination DT. In the example shown in FIG. 12B, the map existence ratios of the route candidates R10A to R10D are calculated. FIG. 12A and FIG. 12B show an example in which whether the amount of the map data for a certain route is larger than that for another route is evaluated based on the map existence ratio. Accordingly, the control device 70 more preferentially selects a route for which the map existence ratio is high than a route for which the map existence ratio is low, as the traveling route of the vehicle 1. Typically, the control device 70 selects the C-route R10C for which the map existence ratio is highest, as the traveling route of the vehicle 1. However, the control device 70 may exclude the C-route R10C from selected objects for the traveling route of the vehicle 1, based on the required time. In this case, for example, the control device 70 selects the D-route R10D, as the traveling route of the vehicle 1.

Other Functions

Setting of Priority

The control device 70 more preferentially selects the route for which the amount of the map data is large than the route for which the amount of the map data is small, as the traveling route of the vehicle 1. As described above, the control device 70 may consider an index different from the map data, in the selection of the traveling route of the vehicle 1. For example, the control device 70 may exclude a route for which the required time is extremely long, from selected objects for the traveling route of the vehicle 1, based on the required time. Thereby, within a range in which the required time is not extremely long, a route for which the amount of the map data is larger is selected as the traveling route of the vehicle 1.

In some cases, the user hopes a route on which the comfortableness is higher, without minding the length of the required time. Hence, the control device 70 according to the embodiment may accept user's input for setting the priority regarding the use of the map data, in the navigation function. The control device 70 may select the traveling route of the vehicle 1, such that the degree of the consideration of an index different from the map data, in other words, the degree of the selection of the traveling route based on the index decreases as the priority set by the user is higher.

The user performs the setting input of the priority, through the HMI 64. The control device 70 acquires the priority set by the user, from the HMI 64. As an example of the setting input of the priority, the priority is set in stages. For example, the user sets the priority in three stages of level 1 to level 3. In this case, suppose that level 1 is the default and the priority becomes higher in the order of level 2 and level 3. In the example shown in FIG. 12A and FIG. 12B, suppose that the control device 70 selects the D-route R10D as the traveling route of the vehicle 1, when level 1 is set. For example, when the user sets the priority to level 3, the control device 70 decreases the degree of the consideration of the required time and the like, and selects the C-route R10C as the traveling route of the vehicle 1.

As another example of the setting input of the priority, whether the map data is more preferentially used than each index is relatively set. For example, the user sets whether the map data is more preferentially used, for each of the required time, the distance to the destination, and the fee. An example in which the required time is set as the default so as to be more preferentially used than the map data and the control device 70 selects, as the traveling route of the vehicle 1, the D-route R10D from the route candidates R10A to R10D shown in FIG. 12A and FIG. 12B will be described. When the user sets the priority such that the map data is more preferentially used than the required time, the control device 70 decreases the degree of the consideration of the required time, and selects the C-route R10C as the traveling route of the vehicle 1. That is, as the priority of the use of the map data is higher than the priority of the selection of the traveling route based on the index, the traveling route is more preferentially selected based on the amount of the map data.

In this way, the user can set the priority about the use of the map data. Thereby, the user can change the degree of the consideration of the index different from the map data. As a result, it is possible to improve the usability of the navigation function.

Functions During Traveling of Vehicle on Traveling Route

In the case where the vehicle 1 travels on a section of the traveling route for which there is the map data after the navigation for the selected traveling route is started, a position for which the amount of the map data is large and a position for which the amount of the map data is small sometimes exist in a mixed manner, even in the section. For example, in the case where the section includes a plurality of lanes, there is the map data for a certain lane and there is no map data for another lane, in some cases. Further, even in an identical lane, the amount of the map data for a left-side place is large and the amount of the map data for a right-side place is small, in some cases. When the vehicle 1 travels at a position for which there is no or little map data although the vehicle 1 travels on a section for which there is the map data, the effectiveness of the preview control decreases.

Hence, the control device 70 according to the embodiment may be configured to present, to the user, information (referred to as "recommended position information", hereinafter) indicating a position where the vehicle 1 is recommended to travel, based on a position with the map data. The recommended position information may indicate at least one of a lane, a place in a lane, and a guide line.

Figure 13A:
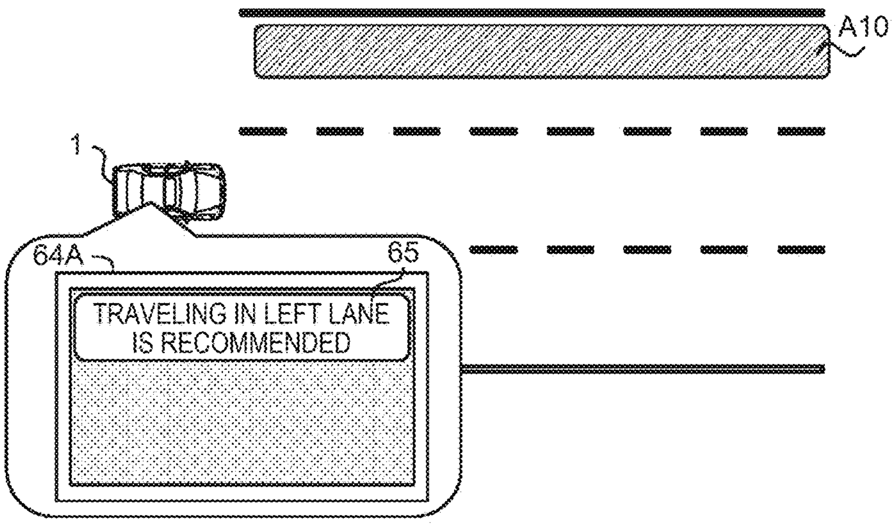
FIG. 13A is a conceptual diagram showing an example of recommended position information.
Figure 13B:
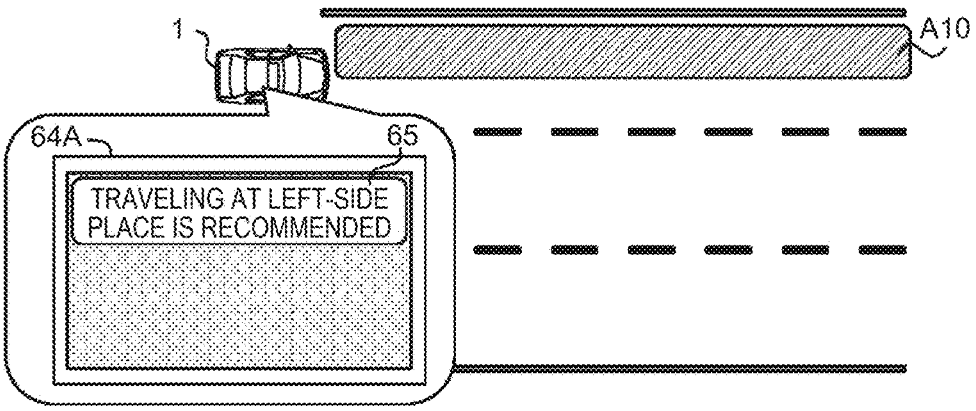
FIG. 13B is a conceptual diagram showing an example of the recommended position information.
Figure 13C:
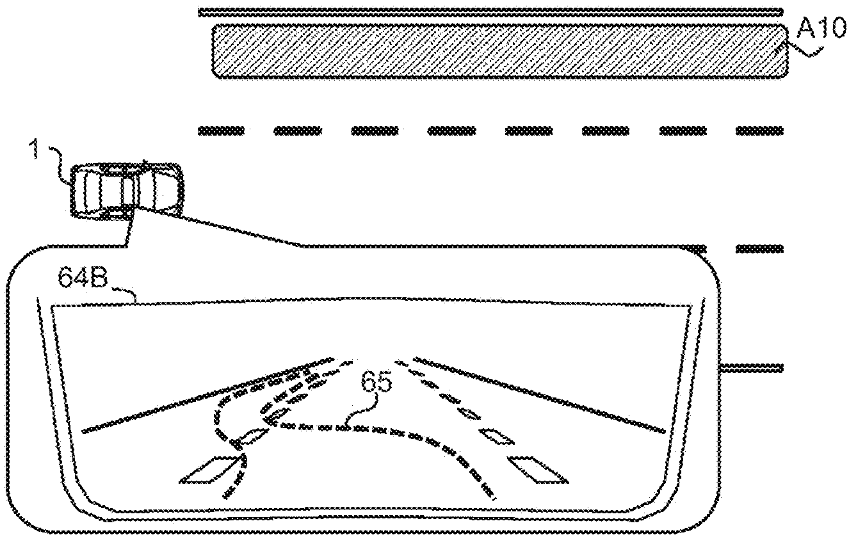
FIG. 13C is a conceptual diagram showing an example of the recommended position information.

Each of FIG. 13A, FIG. 13B, and FIG. 13C is a conceptual diagram showing an example of recommended position information 65. Each of FIG. 13A, FIG. 13B, and FIG. 13C conceptually shows an area A10 that is on the traveling route of the vehicle 1 and for which there is the map data or the amount of the map data is large. The area A10 is at a left-side position in a left lane as viewed from the vehicle 1.

FIG. 13A shows a case where the recommended position information 65 indicates a lane where the vehicle 1 is recommended to travel. In FIG. 13A, the vehicle 1 is traveling in a central lane. At this time, as shown in FIG. 13A, the recommended position information 65 indicating that the traveling in the left lane is recommended is displayed on a display 64A. By the recommended position information 65 displayed on the display 64A, it is possible to prompt the user to travel in the left lane.

FIG. 13B shows a case where the recommended position information 65 indicates a position that is in a lane and where the vehicle 1 is recommended to travel. In FIG. 13B, the vehicle 1 is traveling in the left lane. At this time, as shown in FIG. 13B, the recommended position information 65 indicating that the traveling at a left-side place in the lane is recommended is displayed on the display 64A. By the recommended position information 65 displayed on the display 64A, it is possible to prompt the user to travel at the left-side place.

FIG. 13C shows a case where the recommended position information 65 indicates a guide line where the vehicle 1 is recommended to travel. In FIG. 13C, the vehicle 1 is traveling in the central lane. At this time, as shown in FIG. 13C, guide lines extending toward a left-side place in the left lane are displayed on a head-up display 64B, as the recommended position information 65. By the recommended position information 65 displayed on the head-up display 64B, it is possible to prompt the user to travel at the left-side place in the left lane along the guide lines.

In this way, the control device 70 may present the recommended position information 65 to the user, while the vehicle 1 is traveling on the traveling route. Thereby, it is possible to prompt the user to travel at the position for which there is the map data or the amount of the map data is large, and to improve the effectiveness of the preview control. As a result, it is possible to improve the comfortableness of the vehicle 1.

The control device 70 may be further configured to present, to the user, information (referred to as "acquisition notice information", hereinafter) indicating that the unsprung displacement Zu about the traveling position of the vehicle 1 has been acquired, while the unsprung displacement Zu can be acquired from the map data about the unsprung displacement map 200.

Figure 14:
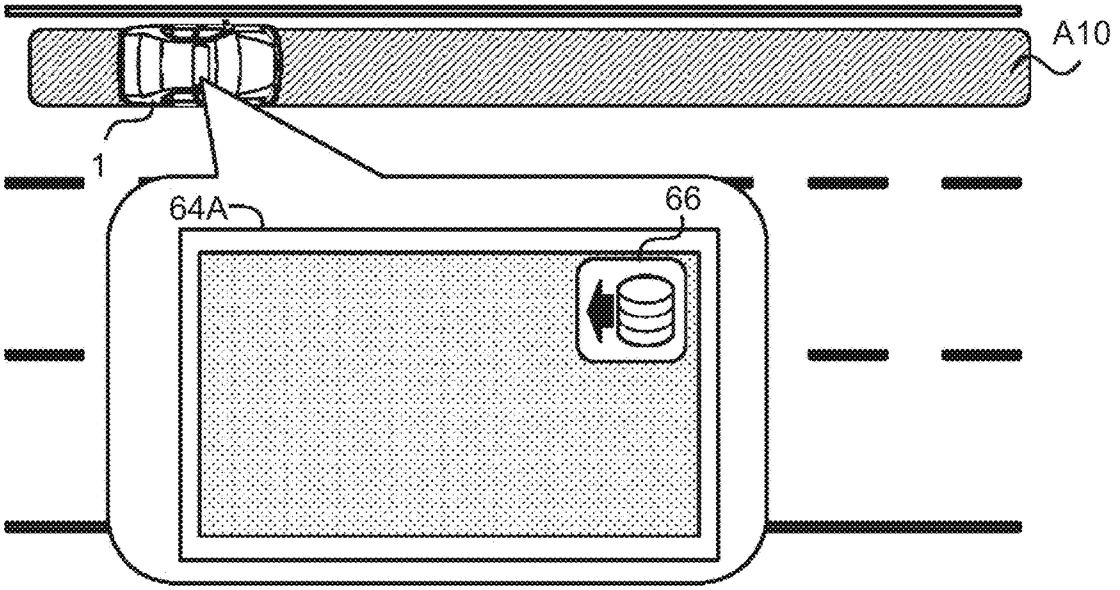
FIG. 14 is a conceptual diagram showing an example of acquisition notice information.

FIG. 14 is a conceptual diagram showing an example of acquisition notice information 66. In FIG. 14, the area A10 that is on the traveling route of the vehicle 1 and for which there is the map data is shown similarly to FIG. 13A to FIG. 13C. In FIG. 14, the vehicle 1 is traveling at the area A10. That is, the control device 70 can acquire the unsprung displacement Zu about the traveling position of the vehicle 1, from the map data. At this time, as shown in FIG. 14, an icon indicating that the unsprung displacement Zu has been acquired from the map data is displayed on the display 64A, as the acquisition notice information 66. The acquisition notice information 66 may be textual information, such as "The control using the map data is being executed". Alternatively, the acquisition notice information 66 may be shown by the lighting of an indicator.

In this way, the control device 70 may present the acquisition notice information 66 to the user, while the vehicle 1 is traveling on the traveling route. Thereby, the user can visually recognize that the control using the map data is being executed. As a result, the user can actually feel the effect of the control using the map data.

Function after Completion of Traveling of Vehicle on Traveling Route

The control device 70 may be configured to present, to the user, information (referred to as "acquisition ratio relevant information", hereinafter) relevant to the ratio of a section for which the unsprung displacement Zu has been acquired on the traveling route from the map data about the unsprung displacement map 200, after the vehicle 1 completes the traveling on the traveling route.

Figure 15A:
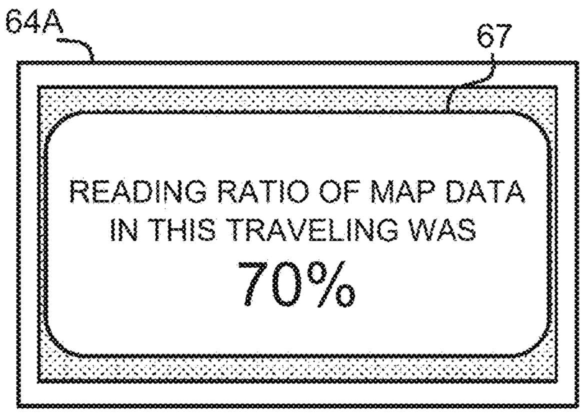
FIG. 15A is a conceptual diagram showing an example of acquisition ratio relevant information.
Figure 15B:
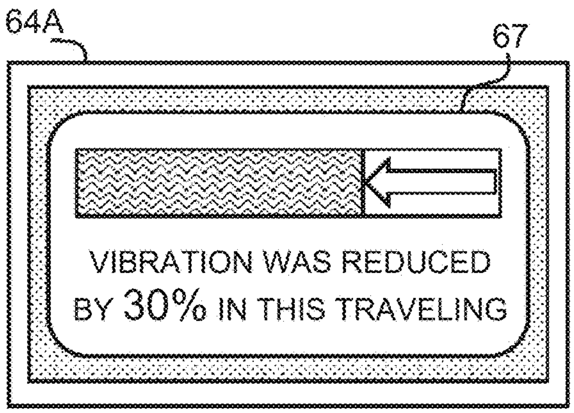
FIG. 15B is a conceptual diagram showing an example of the acquisition ratio relevant information.

Each of FIG. 15A and FIG. 15B is a conceptual diagram showing an example of acquisition ratio relevant information 67. In the example shown in FIG. 15A, the reading ratio of the map data is displayed on the display 64A, as the acquisition ratio relevant information 67. It is thought that the amount of the reduction in vibration due to the execution of the preview control increases as the ratio of the section for which the unsprung displacement Zu has been acquired from the map data increases. In the example shown in FIG. 15B, the amount of the reduction in vibration is displayed on the display 64A, as the acquisition ratio relevant information 67. The amount of the reduction in vibration may be calculated depending on the ratio of the section for which the unsprung displacement Zu has been acquired from the map data.

In this way, the control device 70 may present the acquisition ratio relevant information 67 to the user, after the vehicle 1 completes the traveling on the traveling route. Thereby, the user can visually recognize a degree to which the control using the map data has been executed in this traveling. As a result, it is possible to cause the user to have a satisfaction feeling about the execution of the control using the map data. Furthermore, it is possible to prompt the user to travel on the route for which there is the map data, at the time of the next traveling or the like.

Effect

As described above, with the embodiment, the route for which the amount of the map data is large is more preferentially selected than the route for which the amount of the map data is small, as the traveling route of the vehicle 1. Thereby, it is possible to select a route for which the amount of the map data is larger and for which the effectiveness of the preview control is higher, as the traveling route of the vehicle 1. As a result, it is possible to improve the comfortableness of the vehicle 1. In the embodiment, the case where the vehicle 1 executes the preview control has been described. However, the embodiment can be applied to another vehicle control using the map data.

Navigation System

Figure 16:
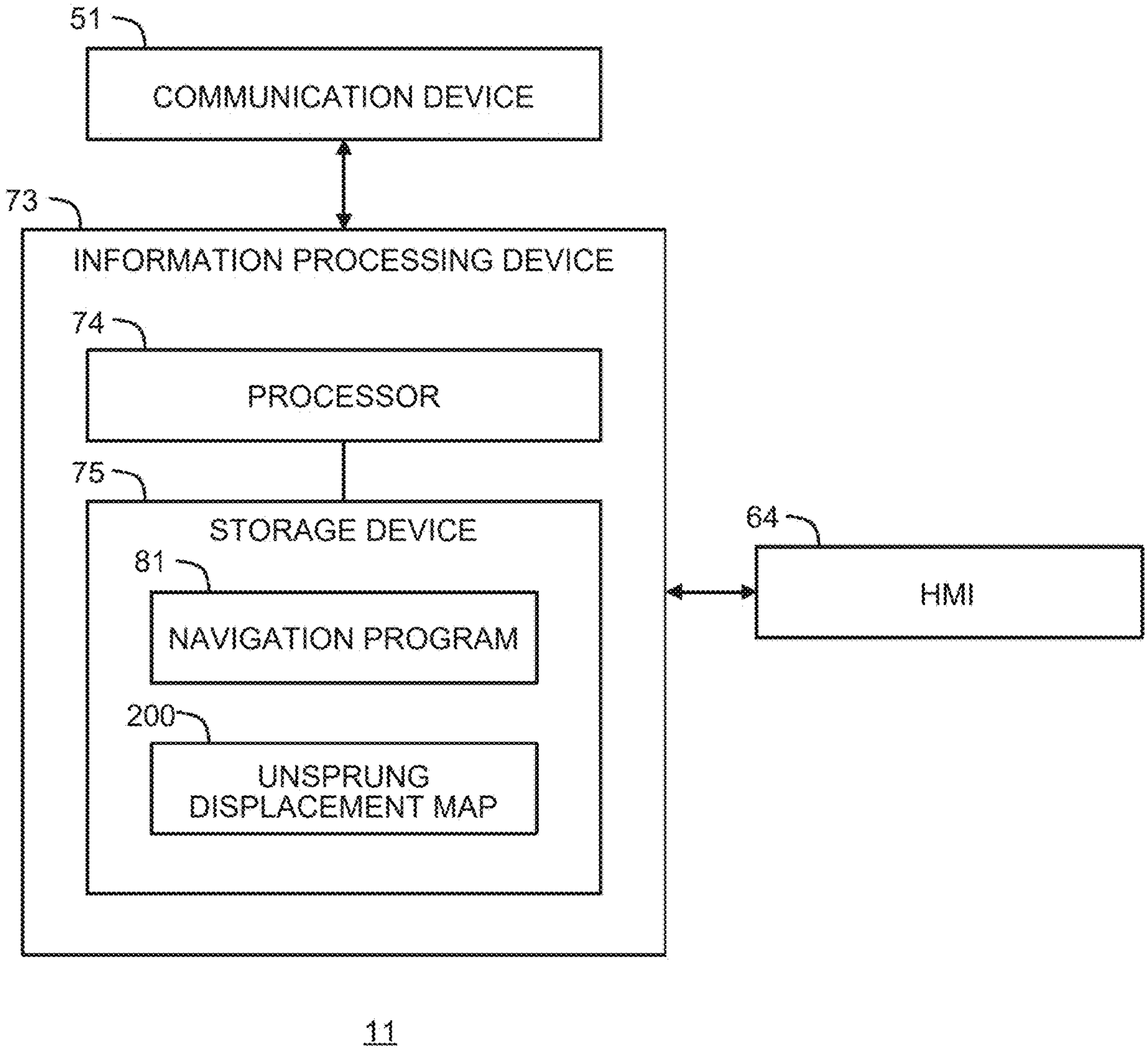
FIG. 16 is a block diagram showing an exemplary configuration of a navigation system according to the embodiment.

The above-described navigation function may be provided by a separate navigation system from the vehicle control system 10. FIG. 16 is a block diagram showing an exemplary configuration of a navigation system 11 according to the embodiment. The navigation system 11 may be equipped in the vehicle 1. The navigation system 11 includes a communication device 51, an HMI 64, and an information processing device 73.

The communication device 51 communicates with the exterior of the navigation system 11. Particularly, the communication device 51 communicates with the vehicle control system 10, and acquires the unsprung displacement map 200 that is stored in the storage device 72 of the vehicle control system 10. Alternatively, the communication device 51 may acquire the unsprung displacement map 200 by communicating with the map management system 100.

The information processing device 73 is a computer that performs information processing in the navigation system 11. The information processing device 73 includes one or more processors 74 (referred to as merely a processor 74, hereinafter) and one or more storage devices 75 (referred to as merely a storage device 75, hereinafter).

The processor 74 executes various processes. For example, the processor 74 is constituted by a general-purpose processor, an application specific processor, a CPU, a GPU, an ASIC, an FPGA, an integrated circuit, a conventional circuit, or one or more combinations of them. The storage device 75 stores a variety of information necessary for the processor 74 to execute processes. For example, the storage device 75 is constituted by a recording medium such as a RAM, a ROM, an SSD, and an HDD.

The storage device 75 stores a navigation program 81. The navigation program 81 is a computer program for the navigation function, and is executed by the processor 74. The navigation program 81 is constituted by an instruction set in which processes to be executed by the processor 74 are written. The navigation program 81 is recorded in a computer-readable recording medium. The processor 74 executes the navigation program 81, such that the navigation function of the navigation system 11 is realized.

The storage device 75 stores the unsprung displacement map 200 acquired through the communication device 51. The unsprung displacement map 200 stored in the storage device 75 is synchronized with the unsprung displacement map 200 stored in the storage device 72 of the vehicle control system 10.

The navigation system 11 according to the embodiment is configured as described above. The navigation system 11 can provide the above-described navigation function. The navigation system 11 can exert the same effect as the above-described effect.

What is claimed is:

1. A vehicle control system comprising:

a storage device configured to store map data in which a vertical motion parameter is associated with a position on a map, the vertical motion parameter being relevant to vertical motion of a wheel of a vehicle; and one or more processors configured to control an objective vehicle based on the vertical motion parameter to be acquired from the map data, wherein the one or more processors are configured to select, as a traveling route of the objective vehicle, a route for which an amount of the map data is larger in preference to a route for which the amount of the map data is smaller.

2. The vehicle control system according to claim 1, wherein the selecting, as the traveling route of the objective vehicle, the route for which the amount of the map data is larger in preference to the route for which the amount of the map data is smaller includes selecting, as the traveling route of the objective vehicle, a route for which a ratio of a section with the map data is higher in preference to a route for which the ratio of the section with the map data is lower.

3. The vehicle control system according to claim 1, wherein the selecting, as the traveling route of the objective vehicle, the route for which the amount of the map data is larger in preference to the route for which the amount of the map data is smaller includes selecting, as the traveling route of the objective vehicle, a route for which a section with the map data is longer in preference to a route for which the section with the map data is shorter.

4. The vehicle control system according to claim 1, wherein:

in the map data, the number of times of traveling of a vehicle that gets involved in evaluation of the vertical motion parameter is further associated with the position on the map; and the selecting, as the traveling route of the objective vehicle, the route for which the amount of the map data is larger in preference to the route for which the amount of the map data is smaller includes selecting, as the traveling route of the objective vehicle, a route for which the number of times of the traveling per unit distance is larger in preference to a route for which the number of times of the traveling per unit distance is smaller.

5. The vehicle control system according to claim 1, wherein the one or more processors are further configured to select the traveling route of the objective vehicle based on an index different from the map data, acquire a priority regarding use of the map data that is set by a user, and select the traveling route of the objective vehicle such that a degree of the selection of the traveling route based on the index is lowered as the priority is higher.

6. The vehicle control system according to claim 1, wherein the one or more processors are further configured to present recommended position information to a user based on a position with the map data, while the objective vehicle is traveling on the traveling route, the recommended position information indicating a position where the objective vehicle is recommended to travel.

7. The navigation system according to claim 6, wherein the recommended position information indicates at least one of a lane, a place in a lane, and a guide line.

8. The vehicle control system according to claim 1, wherein the one or more processors are further configured to present, to a user, information indicating that the vertical motion parameter relating to a traveling position of the objective vehicle has been acquired, while the objective vehicle is traveling on the traveling route and the vertical motion parameter is enabled to be acquired from the map data.

9. The vehicle control system according to claim 1, wherein the one or more processors are further configured to present, to a user, information relevant to a ratio of a section for which the vertical motion parameter has been acquired on the traveling route from the map data, after the objective vehicle completes traveling on the traveling route.

* * * * *